United States Patent
Wang et al.

(10) Patent No.: US 12,532,206 B2
(45) Date of Patent: Jan. 20, 2026

(54) COMMUNICATION METHOD AND APPARATUS

(71) Applicant: Huawei Technologies Co., Ltd., Shenzhen (CN)

(72) Inventors: Jian Wang, Hangzhou (CN); Chen Xu, Hangzhou (CN); Tianhang Yu, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 18/153,606

(22) Filed: Jan. 12, 2023

(65) Prior Publication Data
US 2023/0171634 A1 Jun. 1, 2023

Related U.S. Application Data

(63) Continuation of application No. PCT/CN2021/100486, filed on Jun. 17, 2021.

(30) Foreign Application Priority Data

Jul. 13, 2020 (CN) .......................... 202010667227.7

(51) Int. Cl.
*H04W 24/10* (2009.01)
*H04W 8/22* (2009.01)
(Continued)

(52) U.S. Cl.
CPC ............ *H04W 24/10* (2013.01); *H04W 8/22* (2013.01); *H04W 72/0446* (2013.01); *H04W 72/0453* (2013.01); *H04W 72/20* (2023.01)

(58) Field of Classification Search
CPC ... H04W 24/10; H04W 8/22; H04W 72/0446; H04W 72/0453; H04W 72/20;
(Continued)

(56) References Cited

U.S. PATENT DOCUMENTS 11,677,449 B2 * 6/2023 Shattil ................. H04W 72/046
375/267
11,936,452 B2 * 3/2024 Yoo ....................... H04L 1/0041
(Continued)

FOREIGN PATENT DOCUMENTS

CN 109474316 A 3/2019
CN 109743210 B 4/2020
(Continued)

OTHER PUBLICATIONS

Guo Jiajia et al:"Convolutional Neural Network-Based Multiple-Rate Compressive Design, Simulation, and Analysis", Sensing for Massive MIMO CSI Feedback: IEEE Transactions on Wirelesscommunications, IEEE Service Center, Ipiscataway, NJ, US, vol. 19, No. 4,Jan. 28, 2020 (Jan. 28, 2020), pp. 2827-2840, 011782622, total 14 pages.

*Primary Examiner* — Brian T O Connor
(74) *Attorney, Agent, or Firm* — Slater Matsil, LLP

(57) ABSTRACT

This application provides a communication method and apparatus. The method may include: A first communication apparatus receives configuration information of a first neural network; the first communication apparatus determines the first neural network based on the configuration information of the first neural network; the first communication apparatus obtains first channel information based on channel information obtained through measurement and the first neural network, where a data amount of the first channel information is less than a data amount of the channel information obtained through measurement; and the first communication apparatus sends the first channel information, where the first channel information is used to obtain second channel information by using a second neural network, and the second channel information is used for data transmission.

20 Claims, 7 Drawing Sheets

(51) Int. Cl.
*H04W 72/0446* (2023.01)
*H04W 72/0453* (2023.01)
*H04W 72/20* (2023.01)

(58) Field of Classification Search
CPC ...... H04W 8/24; H04W 24/02; H04B 7/0626;
H04B 7/0413; H04B 7/0456; G06N 3/04;
G06N 3/045; G06N 3/08; G06F 16/901;
G06F 16/903; H04L 41/16; H04L
25/0254; H04L 25/024
See application file for complete search history.

(56) References Cited

U.S. PATENT DOCUMENTS

| | | | | |
|---|---|---|---|---|
| 11,949,615 | B2* | 4/2024 | Pezeshki | H04W 16/28 |
| 12,040,857 | B2* | 7/2024 | Ait Aoudia | H04B 7/08 |
| 12,095,684 | B2* | 9/2024 | Park | H04L 5/0094 |
| 12,206,535 | B1* | 1/2025 | Shattil | H04L 27/2614 |
| 12,284,654 | B2* | 4/2025 | Yu | H04W 76/27 |
| 2021/0266763 | A1* | 8/2021 | Yoo | H04W 24/02 |
| 2021/0273707 | A1* | 9/2021 | Yoo | H04L 1/0041 |
| 2021/0385040 | A1* | 12/2021 | Pezeshki | H04L 25/0254 |
| 2024/0284201 | A1* | 8/2024 | Ren | H04W 24/02 |

FOREIGN PATENT DOCUMENTS

| | | | |
|---|---|---|---|
| EP | 3557846 | A1 | 10/2019 |
| EP | 4156538 | A1 | 3/2023 |

\* cited by examiner

COMMUNICATION METHOD AND APPARATUS

CROSS-REFERENCE TO RELATED APPLICATIONS

This application is a continuation of International Patent Application No. PCT/CN2021/100486, filed on Jun. 17, 2021, which claims priority to Chinese Patent Application No. 202010667227.7, filed on Jul. 13, 2020. The disclosures of the aforementioned applications are hereby incorporated by reference in their entireties.

TECHNICAL FIELD

This application relates to the communication field, and more specifically, to a communication method and apparatus.

BACKGROUND

In a massive multiple-input multiple-output (MIMO) technology, a network device may reduce interference between a plurality of terminal devices and interference between a plurality of signal streams of a same terminal device by using a precoding technology. Therefore, signal quality is improved, spatial multiplexing is implemented, and spectrum utilization is improved.

For example, a terminal device may determine, in a manner such as channel measurement, a precoding matrix that adapts to a downlink channel, and expects that, through feedback, the network device obtains a precoding matrix that is the same as or similar to a precoding vector determined by the terminal device. Alternatively, the network device may determine, for example, in a manner such as channel measurement, a precoding matrix that adapts to an uplink channel, and expects that, through feedback, the terminal device obtains a precoding matrix that is the same as or similar to a precoding vector determined by the network device.

Because there is a large amount of data of channel information obtained through channel measurement, if the channel information obtained through channel measurement is directly fed back, large feedback overheads are caused. Therefore, to reduce feedback, channel information is usually quantized according to a fixed codebook and then fed back. However, the fixed codebook may not match a real channel. As a result, a system throughput is not optimal.

SUMMARY

This application provides a communication method, to implement channel information feedback and improve a system throughput.

According to a first aspect, a communication method is provided. The method may include: A first communication apparatus receives configuration information of a first neural network; the first communication apparatus determines the first neural network based on the configuration information of the first neural network; the first communication apparatus obtains first channel information based on channel information obtained through measurement and the first neural network, where a data amount of the first channel information is less than a data amount of the channel information obtained through measurement; and the first communication apparatus sends the first channel information, where the first channel information is used to obtain second channel information by using a second neural network, and the second channel information is used for data transmission.

Based on the foregoing technical solution, a second communication apparatus sends the configuration information of the first neural network to the first communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

With reference to the first aspect, in some implementations of the first aspect, the configuration information of the first neural network is a first index value, the first index value is used to determine a configuration parameter of the first neural network, and the first index value corresponds to a group of configuration parameters in a configuration parameter set of the neural network.

With reference to the first aspect, in some implementations of the first aspect, the configuration information of the first neural network includes a configuration parameter of the first neural network.

With reference to the first aspect, in some implementations of the first aspect, the configuration parameter of the first neural network includes a structure of the first neural network and a parameter in the first neural network; the structure of the first neural network includes one or more of the following: a type of the first neural network, a layer quantity of the first neural network, a node quantity of the first neural network, and a node connection manner of the first neural network; and the parameter in the first neural network includes one or more of the following parameters: a weight matrix, a weight vector, a bias matrix, a bias vector, and an activation function.

With reference to the first aspect, in some implementations of the first aspect, the method further includes: The first communication apparatus sends first capability information, where the first capability information indicates a processing capability of the first communication apparatus.

With reference to the first aspect, in some implementations of the first aspect, that a first communication apparatus receives configuration information of a first neural network includes: The first communication apparatus receives first indication information, where the first indication information indicates to feed back the first channel information, and the first indication information further includes the configuration information of the first neural network.

With reference to the first aspect, in some implementations of the first aspect, before the first communication apparatus sends the first channel information, the method further includes: The first communication apparatus sends a first request message, where the first request message is used to request a first time-frequency resource, the first time-frequency resource is used to transmit the first channel information, and the first request message further indicates the data amount of the first channel information; and the first communication apparatus receives second indication information, where the second indication information indicates configuration information of the first time-frequency resource.

Based on the foregoing technical solution, after the second communication apparatus receives the first request message, the second communication apparatus may properly allocate a resource to the first communication apparatus based on the data amount that is of the first channel information and that is indicated by the first request message.

With reference to the first aspect, in some implementations of the first aspect, before the first communication apparatus receives the configuration information of the first neural network, the method further includes: The first communication apparatus sends a first request message, where the first request message is used to request a first time-frequency resource, and the first time-frequency resource is used to transmit the first channel information; and that a first communication apparatus receives configuration information of a first neural network includes: The first communication apparatus receives second indication information, where the second indication information indicates configuration information of the first time-frequency resource, and the second indication information further includes the configuration information of the first neural network.

According to a second aspect, a communication method is provided. The method may include: A second communication apparatus sends configuration information of a first neural network; the second communication apparatus receives first channel information that is fed back, where the first channel information is obtained based on channel information obtained through measurement and the first neural network, and a data amount of the first channel information is less than a data amount of the channel information obtained through measurement; and the second communication apparatus performs data transmission based on second channel information, where the second channel information is obtained based on the first channel information by using a second neural network.

Based on the foregoing technical solution, the second communication apparatus sends the configuration information of the first neural network to a first communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

With reference to the second aspect, in some implementations of the second aspect, the configuration information of the first neural network is a first index value, the first index value is used to determine a configuration parameter of the first neural network, and the first index value corresponds to a group of configuration parameters in a configuration parameter set of the neural network.

With reference to the second aspect, in some implementations of the second aspect, the configuration information of the first neural network includes a configuration parameter of the first neural network.

With reference to the second aspect, in some implementations of the second aspect, the configuration parameter of the first neural network includes a structure of the first neural network and a parameter in the first neural network; the structure of the first neural network includes one or more of the following: a type of the first neural network, a layer quantity of the first neural network, a node quantity of the first neural network, and a node connection manner of the first neural network; and the parameter in the first neural network includes one or more of the following parameters: a weight matrix, a weight vector, a bias matrix, a bias vector, and an activation function.

With reference to the second aspect, in some implementations of the second aspect, before the second communication apparatus sends the configuration information of the first neural network, the method further includes: The second communication apparatus determines the configuration information of the first neural network and the second neural network.

With reference to the second aspect, in some implementations of the second aspect, before the second communication apparatus determines the configuration information of the first neural network and the second neural network, the method further includes: The second communication apparatus receives first capability information, where the first capability information indicates a processing capability of a first communication apparatus.

Optionally, the second communication apparatus may determine the configuration information of the first neural network and the second neural network based on a processing capability of the first communication apparatus.

With reference to the second aspect, in some implementations of the second aspect, that a second communication apparatus sends configuration information of a first neural network includes: The second communication apparatus sends first indication information, where the first indication information indicates to feed back the first channel information, and the first indication information further includes the configuration information of the first neural network.

With reference to the second aspect, in some implementations of the second aspect, before the second communication apparatus receives the first channel information that is fed back, the method further includes: The second communication apparatus receives a first request message, where the first request message is used to request a first time-frequency resource, the first time-frequency resource is used to transmit the first channel information, and the first request message further indicates the data amount of the first channel information; and the second communication apparatus sends second indication information, where the second indication information indicates configuration information of the first time-frequency resource.

Based on the foregoing technical solution, after the second communication apparatus receives the first request message, the second communication apparatus may properly allocate a resource to the first communication apparatus based on the data amount that is of the first channel information and that is indicated by the first request message.

With reference to the second aspect, in some implementations of the second aspect, before the second communication apparatus sends the configuration information of the first neural network, the method further includes: The second communication apparatus receives a first request message, where the first request message is used to request a first time-frequency resource, and the first time-frequency resource is used to transmit the first channel information; and that a second communication apparatus sends configuration information of a first neural network includes: The second communication apparatus sends second indication information, where the second indication information indicates configuration information of the first time-frequency resource, and the second indication information further includes the configuration information of the first neural network.

With reference to the second aspect, in some implementations of the second aspect, that a second communication apparatus sends configuration information of a first neural network includes: The second communication apparatus periodically sends the configuration information of the first neural network; or the second communication apparatus sends the configuration information of the first neural network when determining that decoding performance of first data is lower than a preset threshold, where the first data is sent by the second communication apparatus based on the second channel information.

According to a third aspect, a communication method is provided. The method may include: A first communication apparatus sends configuration information of a second neural network; the first communication apparatus obtains first channel information based on channel information obtained through measurement and the first neural network, where a data amount of the first channel information is less than a data amount of the channel information obtained through measurement; and the first communication apparatus sends the first channel information, where the first channel information is used to obtain second channel information by using the second neural network, and the second channel information is used for data transmission.

Based on the foregoing technical solution, the first communication apparatus sends the configuration information of the second neural network to a second communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

With reference to the third aspect, in some implementations of the third aspect, the configuration information of the second neural network is a second index value, the second index value is used to determine a configuration parameter of the second neural network, and the second index value corresponds to a group of configuration parameters in a configuration parameter set of the neural network.

With reference to the third aspect, in some implementations of the third aspect, the configuration information of the second neural network includes a configuration parameter of the second neural network.

With reference to the third aspect, in some implementations of the third aspect, the configuration parameter of the second neural network includes a structure of the second neural network and a parameter in the second neural network; the structure of the second neural network includes one or more of the following: a type of the second neural network, a layer quantity of the second neural network, a node quantity of the second neural network, and a node connection manner of the second neural network; and the parameter in the second neural network includes one or more of the following parameters: a weight matrix, a weight vector, a bias matrix, a bias vector, and an activation function.

With reference to the third aspect, in some implementations of the third aspect, before the first communication apparatus sends the configuration information of the second neural network, the method further includes: The first communication apparatus receives first indication information, where the first indication information indicates to feed back the first channel information.

With reference to the third aspect, in some implementations of the third aspect, before the first communication apparatus sends the first channel information, the method further includes: The first communication apparatus sends a first request message, where the first request message is used to request a first time-frequency resource, the first time-frequency resource is used to transmit the first channel information, and the first request message further indicates the data amount of the first channel information; and the first communication apparatus receives second indication information, where the second indication information indicates configuration information of the first time-frequency resource.

Based on the foregoing technical solution, after the second communication apparatus receives the first request message, the second communication apparatus may properly allocate a resource to the first communication apparatus based on the data amount that is of the first channel information and that is indicated by the first request message.

With reference to the third aspect, in some implementations of the third aspect, that a first communication apparatus sends configuration information of a second neural network includes: The first communication apparatus periodically sends the configuration information of the second neural network; or the first communication apparatus sends the configuration information of the second neural network when determining that decoding performance of first data is lower than a preset threshold, where the first data is sent by the second communication apparatus based on the second channel information.

According to a fourth aspect, a communication method is provided. The method may include: A second communication apparatus receives configuration information of a second neural network; the second communication apparatus determines the second neural network based on the configuration information of the second neural network; the second communication apparatus receives first channel information that is fed back, where the first channel information is obtained based on channel information obtained through measurement and a first neural network, and a data amount of the first channel information is less than a data amount of the channel information obtained through measurement; and the second communication apparatus performs downlink data transmission based on second channel information, where the second channel information is obtained based on the first channel information by using the second neural network.

Based on the foregoing technical solution, the first communication apparatus sends the configuration information of the second neural network to a second communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

With reference to the fourth aspect, in some implementations of the fourth aspect, the configuration information of the second neural network is a second index value, the second index value is used to determine a configuration parameter of the second neural network, and the second index value corresponds to a group of configuration parameters in a configuration parameter set of the neural network.

With reference to the fourth aspect, in some implementations of the fourth aspect, the configuration information of the second neural network includes a configuration parameter of the second neural network.

With reference to the fourth aspect, in some implementations of the fourth aspect, the configuration parameter of the second neural network includes a structure of the second neural network and a parameter in the second neural network; the structure of the second neural network includes one or more of the following: a type of the second neural network, a layer quantity of the second neural network, a node quantity of the second neural network, and a node connection manner of the second neural network; and the parameter in the second neural network includes one or more of the following parameters: a weight matrix, a weight vector, a bias matrix, a bias vector, and an activation function.

With reference to the fourth aspect, in some implementations of the fourth aspect, before the second communication apparatus receives the configuration information of the second neural network, the method further includes: The second communication apparatus sends first indication information, where the first indication information indicates to feed back the first channel information.

With reference to the fourth aspect, in some implementations of the fourth aspect, before the second communication apparatus receives the first channel information, the method further includes: The second communication apparatus receives a first request message, where the first request message is used to request a first time-frequency resource, the first time-frequency resource is used to transmit the first channel information, and the first request message further indicates the data amount of the first channel information; and the second communication apparatus sends second indication information, where the second indication information indicates configuration information of the first time-frequency resource.

Based on the foregoing technical solution, after the second communication apparatus receives the first request message, the second communication apparatus may properly allocate a resource to the first communication apparatus based on the data amount that is of the first channel information and that is indicated by the first request message.

According to a fifth aspect, a communication apparatus is provided, including modules or units configured to perform the method in any one of the first aspect and the possible implementations of the first aspect.

According to a sixth aspect, a communication apparatus is provided, including modules or units configured to perform the method in any one of the second aspect and the possible implementations of the second aspect.

According to a seventh aspect, a communication apparatus is provided, including a transceiver unit and a processing unit, where the transceiver unit is configured to send configuration information of a second neural network, and the processing unit is configured to obtain first channel information based on channel information obtained through measurement and a first neural network, where a data amount of the first channel information is less than a data amount of the channel information obtained through measurement; and the transceiver unit is further configured to send the first channel information, where the first channel information is used to obtain second channel information by using the second neural network, and the second channel information is used for data transmission.

With reference to the seventh aspect, in some implementations of the seventh aspect, the configuration information of the second neural network is a second index value, the second index value is used to determine a configuration parameter of the second neural network, and the second index value corresponds to a group of configuration parameters in a configuration parameter set of the neural network.

With reference to the seventh aspect, in some implementations of the seventh aspect, the configuration information of the second neural network includes a configuration parameter of the second neural network.

With reference to the seventh aspect, in some implementations of the seventh aspect, the configuration parameter of the second neural network includes a structure of the second neural network and a parameter in the second neural network; the structure of the second neural network includes one or more of the following: a type of the second neural network, a layer quantity of the second neural network, a node quantity of the second neural network, and a node connection manner of the second neural network; and the parameter in the second neural network includes one or more of the following parameters: a weight matrix, a weight vector, a bias matrix, a bias vector, and an activation function.

With reference to the seventh aspect, in some implementations of the seventh aspect, the transceiver unit is further configured to receive first indication information, where the first indication information indicates to feed back the first channel information.

With reference to the seventh aspect, in some implementations of the seventh aspect, the transceiver unit is further configured to send a first request message, where the first request message is used to request a first time-frequency resource, the first time-frequency resource is used to transmit the first channel information, and the first request message further indicates the data amount of the first channel information; and the transceiver unit is further configured to receive second indication information, where the second indication information indicates configuration information of the first time-frequency resource.

With reference to the seventh aspect, in some implementations of the seventh aspect, the transceiver unit is configured to: periodically send the configuration information of the second neural network; or when determining that decoding performance of first data is lower than a preset threshold, send the configuration information of the second neural network, where the first data is sent by the second communication apparatus based on the second channel information.

According to an eighth aspect, a communication apparatus is provided, including a transceiver unit and a processing unit. The transceiver unit is configured to receive configuration information of a second neural network. The processing unit is configured to determine the second neural network based on the configuration information of the second neural network. The transceiver unit is further configured to receive first channel information that is fed back, where the first channel information is obtained based on channel information obtained through measurement and a first neural network, and a data amount of the first channel information is less than a data amount of the channel information obtained through measurement. The processing unit is further configured to perform downlink data transmission based on second channel information, where the second channel information is obtained based on the first channel information by using the second neural network.

With reference to the eighth aspect, in some implementations of the eighth aspect, the configuration information of the second neural network is a second index value, the second index value is used to determine a configuration parameter of the second neural network, and the second index value corresponds to a group of configuration parameters in a configuration parameter set of the neural network.

With reference to the eighth aspect, in some implementations of the eighth aspect, the configuration information of the second neural network includes a configuration parameter of the second neural network.

With reference to the eighth aspect, in some implementations of the eighth aspect, the configuration parameter of the second neural network includes a structure of the second neural network and a parameter in the second neural network; the structure of the second neural network includes one or more of the following: a type of the second neural network, a layer quantity of the second neural network, a node quantity of the second neural network, and a node connection manner of the second neural network; and the parameter in the second neural network includes one or more of the following parameters: a weight matrix, a weight vector, a bias matrix, a bias vector, and an activation function.

With reference to the eighth aspect, in some implementations of the eighth aspect, the transceiver unit is further configured to send first indication information, where the first indication information indicates to feed back the first channel information.

With reference to the eighth aspect, in some implementations of the eighth aspect, the transceiver unit is further configured to receive a first request message, where the first request message is used to request a first time-frequency resource, the first time-frequency resource is used to transmit the first channel information, and the first request message further indicates the data amount of the first channel information; and the transceiver unit is further configured to send second indication information, where the second indication information indicates configuration information of the first time-frequency resource.

According to a ninth aspect, a communication apparatus is provided, and includes a processor. The processor is coupled to a memory, and may be configured to execute instructions in the memory, to implement the method in any one of the first aspect and the possible implementations of the third aspect. Optionally, the communication apparatus further includes the memory. Optionally, the communication apparatus further includes a communication interface, and the processor is coupled to the communication interface.

In an implementation, the communication apparatus is a first communication apparatus. When the communication apparatus is the first communication apparatus, the communication interface may be a transceiver or an input/output interface.

In another implementation, the communication apparatus is a chip configured in the first communication apparatus. When the communication apparatus is the chip configured in the first communication apparatus, the communication interface may be an input/output interface.

Optionally, the transceiver may be a transceiver circuit. Optionally, the input/output interface may be an input/output circuit.

According to a tenth aspect, a communication apparatus is provided, and includes a processor. The processor is coupled to a memory, and may be configured to execute instructions in the memory, to implement the method in any one of the second aspect and the possible implementations of the fourth aspect. Optionally, the communication apparatus further includes the memory. Optionally, the communication apparatus further includes a communication interface, and the processor is coupled to the communication interface.

In an implementation, the communication apparatus is a second communication apparatus. When the communication apparatus is the second communication apparatus, the communication interface may be a transceiver or an input/output interface.

In another implementation, the communication apparatus is a chip configured in the second communication apparatus. When the communication apparatus is the chip configured in the second communication apparatus, the communication interface may be an input/output interface.

Optionally, the transceiver may be a transceiver circuit. Optionally, the input/output interface may be an input/output circuit.

According to an eleventh aspect, a processor is provided, including: an input circuit, an output circuit, and a processing circuit. The processing circuit is configured to: receive a signal through the input circuit, and transmit a signal through the output circuit, to enable the processor to perform the method in any one of the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a twelfth aspect, a processing apparatus is provided, including a processor and a memory. The processor is configured to: read instructions stored in the memory, receive a signal via a receiver, transmit a signal via a transmitter, and perform the method according to any possible implementation of the first aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Data output by the processor may be output to the transmitter, and input data received by the processor may be from the receiver. The transmitter and the receiver may be collectively referred to as a transceiver.

The processing apparatus in the twelfth aspect may be one or more chips. The processor in the processing apparatus may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

According to a thirteenth aspect, a computer program product is provided. The computer program product includes a computer program (which may also be referred to as code or instructions). When the computer program is run, a computer is enabled to perform the method according to any possible implementation of the first aspect to the fourth aspect.

According to a fourteenth aspect, a computer-readable storage medium is provided. The computer-readable storage medium stores a computer program (which may also be referred to as code or instructions). When the computer program is run on a computer, the method in any one of the possible implementations of the first aspect to the fourth aspect is performed.

According to a fifteenth aspect, a communication system is provided, including the foregoing first communication apparatus and second communication apparatus.

DETAILED DESCRIPTION OF ILLUSTRATIVE EMBODIMENTS

Figure 1:
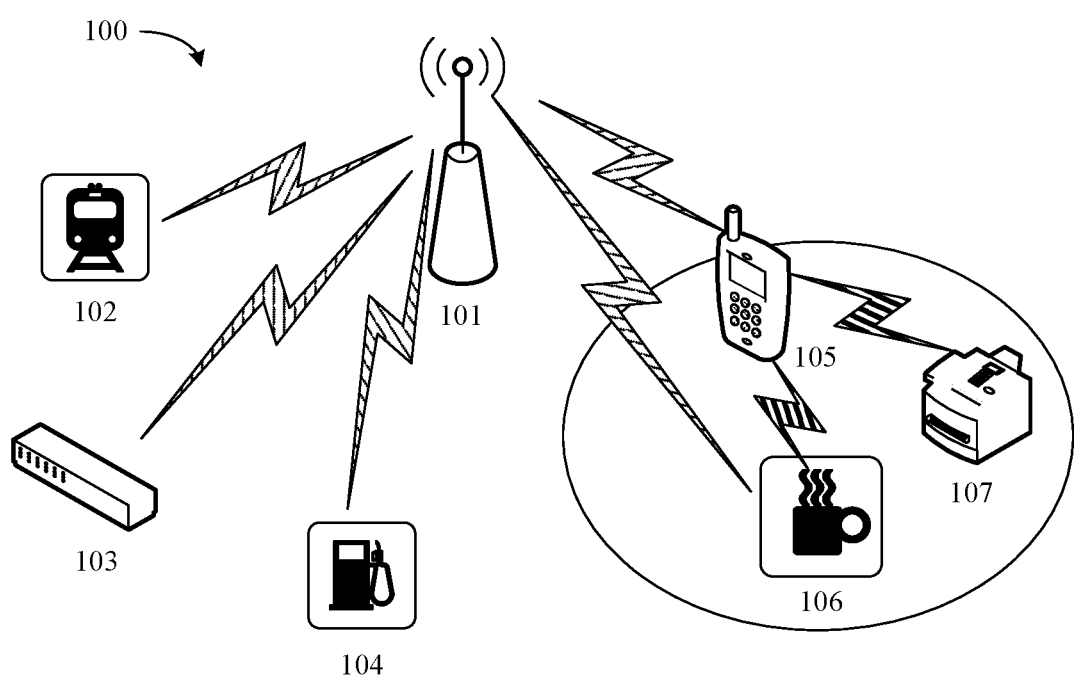
FIG. 1 is a schematic diagram of a communication system to which an embodiment of this application is applicable.

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD), a universal mobile communication system (UMTS), a global interconnected microwave access (WiMAX) communication system, a 5th generation (5G) mobile communication system, or a new radio access technology (NR). The 5G mobile communication system may include a non-standalone (NSA) communication system and/or a standalone (SA) communication system.

The technical solutions in embodiments of this application may be further applied to a non-terrestrial network (NTN) system such as a satellite communication system and a high-altitude platform station (HAPS) communication system, and various mobile communication systems integrated with the satellite communication system.

The technical solutions provided in this application may be further applied to machine type communication (MTC), long term evolution-machine (LTE-M), a device to device (D2D) network, a machine to machine (M2M) network, an internet of things (IoT) network, or another network. The IoT network may include, for example, an internet of vehicles. Communication modes in the internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, vehicle to network (V2N) communication, or the like.

In embodiments of this application, the network device may be any device having a wireless transceiver function.

The device includes but is not limited to: an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system, for example, an NR system, or one antenna panel or a group of antenna panels (including a plurality of antenna panels) of a base station in a 5G system; or may be a network node, for example, a baseband unit (BBU) or a distributed unit (DU), included in a gNB or a transmission point, a base station in a future communication system, or the like.

In some deployments, a gNB may include a central unit (CU) and a DU. The gNB may further include an active antenna unit (AAU). The CU implements a part of functions of the gNB, and the DU implements a part of functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device serves a cell, and a terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have characteristics of small coverage and low transmit power, and are applicable to providing a high-rate data transmission service.

In embodiments of this application, the terminal device may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus.

The terminal device may be a device that provides voice/data connectivity for a user, for example, a handheld device or a vehicle-mounted device having a wireless connection function. Currently, some examples of the terminal may be: a mobile phone, a tablet computer (pad), a computer (for example, a notebook computer or a palmtop computer) having a wireless transceiver function, a mobile internet device (MID), a virtual reality (VR) device, an augmented reality (AR) device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a 5G network, and a terminal device in a future evolved public land mobile network (PLMN).

The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smart watches or smart glasses, and devices that dedicated to only one type of application function and need to work with other devices such as smartphones, such as various smart bands or smart jewelry for monitoring physical signs.

In addition, the terminal device may alternatively be a terminal device in an internet of things (IoT) system. IoT is an important part in future development of information technologies. A main technical feature of the IoT is to connect things to a network by using a communication technology, to implement an intelligent network for human-machine interconnection and thing-thing interconnection. IoT technologies can implement massive connections, deep coverage, and terminal power saving by using, for example, a narrow band (NB) technology.

In addition, the terminal device may alternatively include sensors such as an intelligent printer, a train detector, and a gas station, and main functions of the sensors include: collecting data (which is a function of some terminal devices), receiving control information and downlink data that are of a network device, sending an electromagnetic wave, and transmitting uplink data to the network device.

To facilitate understanding of embodiments of this application, the following first describes a communication system used in a method according to embodiments of this application in detail with reference to FIG. 1. FIG. 1 is a schematic diagram of a communication system 100 used in a method according to an embodiment of this application. As shown in the figure, the communication system 100 may include at least one network device, for example, a network device 101 in a 5G system shown in FIG. 1. The communication system 100 may further include at least one terminal device, for example, terminal devices 102 to 107 shown in FIG. 1. The terminal devices 102 to 107 may be movable or fixed. The network device 101 may communicate with one or more of the terminal devices 102 to 107 over a radio link. Each network device may provide communication coverage for a specific geographic area, and may communicate with a terminal device located in a coverage area. For example, the network device may send configuration information to the terminal device, and the terminal device may send uplink data to the network device based on the configuration information. For another example, the network device may send downlink data to the terminal device. Therefore, a communication system includes the network device 101 and the terminal devices 102 to 107 in FIG. 1.

Optionally, the terminal devices may directly communicate with each other. For example, the terminal devices may directly communicate with each other by using a D2D technology or the like. As shown in the figure, the terminal devices 105 and 106 may directly communicate with each other by using the D2D technology, and the terminal devices 105 and 107 may directly communicate with each other by using the D2D technology. The terminal devices 106 and 107 may separately or simultaneously communicate with the terminal device 105.

The terminal devices 105 to 107 may alternatively communicate with the network device 101 separately. For example, the terminal devices 105 to 107 may direct communicate with the network device 101. For example, the terminal devices 105 and 106 in the figure may directly communicate with the network device 101. Alternatively, the terminal devices 105 to 107 may indirectly communicate with the network device 101. For example, the terminal device 107 in the figure communicates with the network device 101 through the terminal device 106.

It should be understood that, FIG. 1 shows an example of one network device, a plurality of terminal devices, and communication links between communication devices. Optionally, the communication system 100 may include a plurality of network devices, and there may be another quantity of terminal devices in coverage of each network device, for example, there may be more or fewer terminal devices. This is not limited in this application.

A plurality of antennas may be configured for each of the foregoing communication devices, for example, the network device 101 and the terminal devices 102 to 107 in FIG. 1. The plurality of antennas may include at least one transmit antenna configured to send a signal and at least one receive antenna configured to receive a signal. In addition, each communication device additionally includes a transmitter chain and a receiver chain. A person of ordinary skill in the art may understand that both of the transmitter chain and the receiver chain may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Optionally, the wireless communication system 100 may further include another network entity, for example, a network controller or a mobility management entity. This is not limited in this embodiment of this application.

In a wireless communication system, a MIMO technology is usually used to increase a system capacity, that is, a plurality of antennas are simultaneously used at a transmit end and a receive end. Theoretically, a system capacity can be multiplied through the use of the plurality of antennas and spatial multiplexing. However, the use of the plurality of antennas also increases interference. Therefore, signals need to be processed to suppress impact of interference. The method for suppressing interference through signal processing may be implemented at the receive end, or may be implemented at the transmit end. When the method is implemented at the transmit end, a to-be-sent signal may be preprocessed, and then sent through a MIMO channel. In this case, the sending manner is precoding.

To identify useful channels of a MIMO channel matrix H, a plurality of channels need to be converted into a mode that is similar to a one-to-one mode of a single-input single-output (SISO) system. In this way, a transmitted signal S1 corresponds to a received signal R1, and a transmitted signal S2 corresponds to a received signal R2, . . . that is, a plurality of MIMO cross channels are converted into a plurality of parallel one-to-one channels. This process may be implemented by performing singular value decomposition (SVD) on H, that is, $H=U\Sigma V^T$, where U and V are orthogonal matrices, $\Sigma$ is a diagonal matrix, and a non-zero element (that is, an element on a diagonal) of the matrix is a singular value of the channel matrix H. These singular values may be usually arranged in descending order, and a superscript "T" represents a transpose operation. For example, r=H*s+n may be written as $r=U\Sigma V^T*s+n$, where r is a received signal, s is a transmitted signal, and n is channel noise. When to-be-sent data is x, $s=Vx$. $\Sigma^{-1}U^T$ is used to decode the received signal at the receive end, to obtain a plurality of interference-free one-to-one channels. $s=Vx$ is a precoding operation at the transmit end, and V is a precoding matrix.

It can be learned from the foregoing that, to obtain a precoding matrix matching the MIMO channel, the MIMO channel needs to be known. Therefore, the MIMO channel needs to be estimated.

Currently, for a TDD system, because uplink and downlink channels have reciprocity, a network device may obtain downlink channel information based on uplink channel information obtained through measurement, to perform precoding matrix calculation and downlink transmission. For an FDD system, a network device performs precoding matrix calculation and downlink transmission based on channel state information fed back by a terminal device. However, the channel state information fed back by the terminal device is usually determined by using a fixed codebook, and the fixed codebook may not completely match a real MIMO channel. Therefore, an optimal system throughput cannot be achieved. When the terminal device feeds back the MIMO channel obtained through measurement, large feedback overheads are caused.

In view of this, embodiments of this application provide a communication method, to implement feedback on a MIMO channel with low overheads.

The following describes in detail the communication method provided in embodiments of this application with reference to the accompanying drawings.

It should be understood that, merely for ease of understanding and description, the following uses interaction between a first communication apparatus and a second communication apparatus as an example to describe in detail the method provided in embodiments of this application. However, this should not constitute a limitation on an entity for executing the method provided in this application. For example, a terminal device shown in the following embodiments may be replaced with a component (such as a chip or a chip system) configured in a terminal device. Alternatively, a network device shown in the following embodiments may be replaced with a component (such as a chip or a chip system) configured in a network device.

A specific structure of an entity for executing the method provided in embodiments of this application is not particularly limited in the following embodiments, provided that a program that records code of the method provided in embodiments of this application can be run, to perform communication according to the method provided in embodiments of this application. For example, the method provided in embodiments of this application may be performed by a terminal device or a network device, or may be a functional module that is in a terminal device or a network device and that can invoke and execute a program.

The following describes in detail the communication method provided in embodiments of this application with reference to FIG. 2 to FIG. 5.

It should be noted that the first communication apparatus mentioned in the following embodiments may be a terminal device, or may be a component (such as a chip or a chip system) configured in a terminal device. Alternatively, the second communication apparatus may be a network device, or may be a component (such as a chip or a chip system) configured in a network device.

Alternatively, the first communication apparatus may be a network device, or may be a component (such as a chip or a chip system) configured in a network device. The second communication apparatus may be a terminal device, or may be a component (such as a chip or a chip system) configured in a terminal device.

Figure 2:
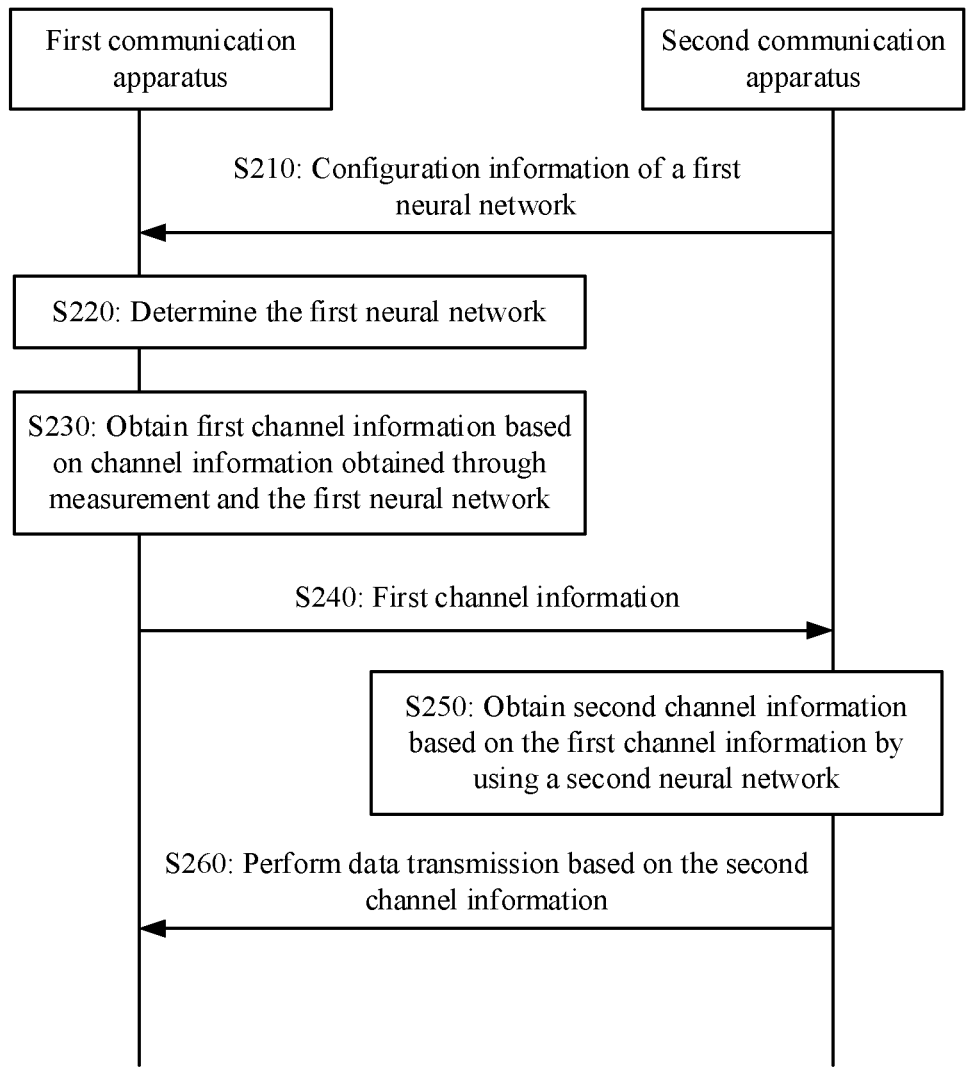
FIG. 2 is a schematic flowchart of a communication method according to an embodiment of this application.

FIG. 2 is a schematic flowchart of a communication method 200 from a perspective of device interaction according to an embodiment of this application. The method 200 shown in FIG. 2 may include S210 to S260. The following describes the steps in the method 200 in detail.

S210: A second communication apparatus sends configuration information of a first neural network. Correspondingly, in S210, a first communication apparatus receives the configuration information of the first neural network.

S220: The first communication apparatus determines the first neural network based on the configuration information of the first neural network.

The first neural network is configured to obtain first channel information based on channel information obtained by the first communication apparatus through measurement. A data amount of the first channel information is less than a data amount of the channel information obtained by the first communication apparatus. In other words, the first neural network is configured to compress the channel information obtained by the first communication apparatus through measurement, to obtain the first channel information.

The first channel information is used to obtain second channel information by using a second neural network. The second channel information is the same as or similar to the channel information obtained by the first communication apparatus through measurement, and the second channel information is used for data transmission.

Specific content of the configuration information of the first neural network is not limited in this embodiment of this application.

In some possible implementations, the configuration information of the first neural network is a first index value, the first index value is used to determine a configuration parameter of the first neural network, and the first index value corresponds to a group of configuration parameters in a configuration parameter set of the neural network. It may be understood that the group of configuration parameters corresponding to the first index value include the configuration parameter of the first neural network.

In this case, after the first communication apparatus receives the first index value, the first communication apparatus may determine the configuration parameter of the first neural network based on the first index value and the configuration parameter set of the neural network stored in a database #1 (the configuration parameter set of the neural network stored in the database #1 is denoted as a configuration parameter set #1 in the following). Further, the first neural network is determined based on the configuration parameter of the first neural network. The database #1 may be a local database of the first communication apparatus, or may be a database of a network element that communicates with the first communication apparatus. This is not limited in this embodiment of this application.

Table 1 shows an example of the configuration parameter set #1.

TABLE 1

| Index value | Configuration parameter |
|---|---|
| 1 | First group of configuration parameters |
| 2 | Second group of configuration parameters |
| 3 | Third group of configuration parameters |
| ... | ... |
| N | $N^{th}$ group of configuration parameters |

N is a positive integer.

As shown in Table 1, different index values are in a one-to-one correspondence with different groups of configuration parameters. For example, if the first index value is 1, the first communication apparatus may determine that the first index value corresponds to the first group of configuration parameters. Further, the configuration parameter of the first neural network may be determined based on the first group of configuration parameters.

Table 2 shows another example of the configuration parameter set #1.

TABLE 2

| Index value | Application scenario | Configuration parameter |
|---|---|---|
| 1 | Scenario 1 | First group of configuration parameters |
| 2 | Scenario 1 | Second group of configuration parameters |
| 3 | Scenario 2 | First group of configuration parameters |
| ... | ... | ... |
| N | Scenario M | $K^{th}$ group of configuration parameters |

N, M, and K are all positive integers. The application scenario may include geographical location information, time information, and the like. The geographical location information may be, for example, indoor, outdoor, urban, or rural. The time information may be, for example, daytime, evening, workday, or rest day.

As shown in Table 2, when the index value is determined, the first communication apparatus may determine a unique group of configuration parameters based on Table 2. For example, if the first index value is 2, it may be determined that the first index value corresponds to the second group of configuration parameters. Further, the configuration parameter of the first neural network may be determined based on the second group of configuration parameters.

Content included in each group of configuration parameters in the configuration parameter set #1 is not limited in this embodiment of this application.

In an example, each group of configuration parameters may include a configuration parameter of the first neural network.

In another example, each group of configuration parameters may include a configuration parameter of the first neural network and a configuration parameter of the second neural network. The first neural network matches the second neural network, that is, the first neural network may be used to encode channel information, and the second neural network may be used to decode the channel information encoded by the first neural network.

In some other possible implementations, the configuration information of the first neural network is a configuration parameter of the first neural network.

The configuration parameter of the first neural network includes a structure of the first neural network and/or a parameter in the first neural network.

The structure of the first neural network includes one or more of the following: a type of the first neural network, a layer quantity of the first neural network, a node quantity of at each layer of the first neural network, and a node connection manner of the first neural network.

The type of the first neural network may be a fully connected neural network, a convolutional neural network, a deep neural network, a recurrent neural network, or the like.

The parameter in the first neural network includes one or more of the following: a weight matrix, a weight vector, a bias matrix, a bias vector, and an activation function.

S230: The first communication apparatus obtains the first channel information based on the channel information obtained through measurement and the first neural network.

When the first communication apparatus is a terminal device, and the second communication apparatus is a network device, the channel information obtained by the first communication apparatus through measurement may be downlink channel information.

When the first communication apparatus is a network device, and the second communication apparatus is a terminal device, the channel information obtained by the first communication apparatus through measurement may be uplink channel information.

For a manner in which the first communication apparatus obtains the channel information by measuring a channel, refer to the conventional technology. Details are not described in this embodiment of this application.

Optionally, the first communication apparatus may directly obtain the first channel information based on channel measurement and the first neural network.

S240: The first communication apparatus sends the first channel information. Correspondingly, in S240, the second communication apparatus receives the first channel information.

S250: The second communication apparatus obtains second channel information based on the first channel information by using a second neural network.

It may be understood that the second channel information is the same as or similar to the channel information obtained by the first communication apparatus through channel measurement.

S260: The second communication apparatus performs data transmission based on the second channel information.

The second communication apparatus may calculate a precoding matrix based on the second channel information. Further, the second communication apparatus sends first data to the first communication apparatus by using the precoding matrix. Correspondingly, after the first communication apparatus receives the first data from the second communication apparatus, the first communication apparatus decodes the first data.

Based on duration of communication between the first communication apparatus and the second communication apparatus, S230 to S260 may be repeated for a plurality of times, that is, the first communication apparatus repeatedly obtains the first channel information, the first communication apparatus repeatedly sends the first channel information, the second communication apparatus repeatedly obtains the second channel information based on the first channel information, and the second communication apparatus repeatedly performs data transmission based on the second channel information.

In this embodiment of this application, the second communication apparatus sends the configuration information of the first neural network to the first communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

Optionally, in S210, the second communication apparatus may send the configuration information of the first neural network when a preset trigger condition is met.

In an example, the preset trigger condition may be that a first timer expires, and the first timer is started when the second communication apparatus previously sends the configuration information of the first neural network.

It may also be understood that the second communication apparatus periodically sends the configuration information of the first neural network. For example, if a period in which the second communication apparatus sends the configuration information of the first neural network is T, the second communication apparatus may set timing duration of the first timer to T.

For example, the second communication apparatus starts the first timer when the second communication apparatus sends the configuration information of the first neural network for an $i^{th}$ time, and when the first timer expires, the second communication apparatus sends the configuration information of the first neural network for a $(i+1)^{th}$ time. The configuration information of the first neural network sent by the second communication apparatus for the $(i+1)^{th}$ time may be the same as or different from the configuration information of the first neural network sent by the second communication apparatus for the $i^{th}$ time. This is not limited in this embodiment of this application. For example, before the configuration information of the first neural network is sent for the $(i+1)^{th}$ time, a scenario between the first communication apparatus and the second communication apparatus changes. In this case, the configuration information of the first neural network that is sent for the $(i+1)^{th}$ time may be different from the configuration information of the first neural network that is sent for the $i^{th}$ time. For another example, before the configuration information of the first neural network is sent for the $(i+1)^{th}$ time, a scenario between the first communication apparatus and the second communication apparatus remains unchanged. In this case, the configuration information of the first neural network that is sent for the $(i+1)^{th}$ time may be the same as the configuration information of the first neural network that is sent for the i$^{th}$ time. i is a positive integer.

In another example, the preset trigger condition may be that the second communication apparatus determines that decoding performance of the first data is lower than a preset threshold. The first data is sent by the second communication apparatus based on the second channel information.

For example, in a process in which the second communication apparatus performs data transmission based on the second channel information, the second communication apparatus first calculates a precoding matrix based on the second channel information. Further, the second communication apparatus sends the first data to the first communication apparatus by using the precoding matrix. Correspondingly, the first communication apparatus decodes the first data. Further, the first communication apparatus may feed back information about a result of decoding the first data to the second communication apparatus. After the second communication apparatus receives the data decoding result information fed back by the first communication apparatus, the second communication apparatus may collect statistics on decoding performance of decoding the first data by the first communication apparatus, and resend the configuration information of a new first neural network when determining that the decoding performance of decoding the first data by the first communication apparatus is lower than the preset threshold. The decoding performance of the first data may be, for example, a packet loss rate of the first data. When the packet loss rate of the first data is higher than a preset packet loss rate threshold, it may be determined that the decoding performance of the first data is lower than the preset threshold.

Optionally, before S210, the method 200 may further include: The second communication apparatus determines the configuration information of the first neural network and the second neural network.

The second communication apparatus may first determine configuration parameter of the second neural network, and then determine the second neural network and the configuration information of the first neural network based on the configuration parameter of the second neural network.

In some possible implementations, the second communication apparatus may determine the configuration parameter of the second neural network from a configuration parameter set of a neural network stored in a database #2 (the configuration parameter set of the neural network stored in the database #2 is denoted as a configuration parameter set #2 in the following).

The database #2 may be a local database of the second communication apparatus, or may be a database of a network element that communicates with the second communication apparatus. This is not limited in this embodiment of this application.

For a form of the configuration parameter set #2, refer to descriptions about the configuration parameter set #1 in Table 1 and Table 2. As described above, each group of configuration parameters in the configuration parameter set #1 may include the configuration parameter of the first neural network, or may include the configuration parameter of the first neural network and the configuration parameter of the second neural network. Similarly, each group of configuration parameters in the configuration parameter set #2 may include the configuration parameter of the second neural network, or may include the configuration parameter of the first neural network and the configuration parameter of the second neural network.

The following shows several possible combination manners of the configuration parameter set #1 and the configuration parameter set #2.

Manner 1: Each group of configuration parameters in the configuration parameter set #1 may include the configuration parameter of the first neural network, and each group of configuration parameters in the configuration parameter set #2 may include the configuration parameter of the second neural network.

Manner 2: Each group of configuration parameters in the configuration parameter set #1 may include the configuration parameter of the first neural network, and each group of configuration parameters in the configuration parameter set #2 may include the configuration parameter of the second neural network and the configuration parameter of the first neural network.

Manner 3: Each group of configuration parameters in the configuration parameter set #1 may include the configuration parameter of the first neural network and the configuration parameter of the second neural network, and each group of configuration parameters in the configuration parameter set #2 may include the configuration parameter of the first neural network and the configuration parameter of the second neural network.

It should be noted that, in the foregoing three manners, the configuration parameter that is of the first neural network and that is determined from the configuration parameter set #1 based on a same index value matches the configuration parameter that is of the second neural network and that is determined from the configuration parameter set #2 based on the same index value. It may be understood that the first neural network and the second neural network that are determined based on matched configuration parameters of the first neural network and the second neural network match each other.

In an example, the second communication apparatus may determine the configuration parameter of the second neural network from the configuration parameter set #2 based on an application scenario.

The second communication apparatus may determine the configuration parameter of the second neural network based on a scenario in which the first neural network and the second neural network are used. For example, if the first communication apparatus and the second communication apparatus use the first neural network and the second neural network in an outdoor scenario, the second communication apparatus may determine, from the configuration parameter set #2, a group of configuration parameters corresponding to the outdoor scenario, to further determine the configuration parameter of the second neural network. For another example, if the first communication apparatus and the second communication apparatus use the first neural network and the second neural network in a daytime scenario, the second communication apparatus may determine, from the configuration parameter set #2, a group of configuration parameters corresponding to the daytime scenario, to further determine the configuration parameter of the second neural network.

In another example, when the second communication apparatus is a terminal device, and the first communication apparatus is a network device, the second communication apparatus may determine the second neural network based on a processing capability of the second communication apparatus and an application scenario.

As shown in Table 2, one application scenario may correspond to a plurality of groups of configuration parameters. If the second communication apparatus determines a plurality of groups of configuration parameters from the configuration parameter set #2 based on the application scenario, the second communication apparatus may further determine a group of configuration parameters from the plurality of groups of configuration parameters based on the processing capability of the second communication apparatus, to further determine the configuration parameter of the second neural network.

Alternatively, the second communication apparatus may first determine a plurality of groups of configuration parameters from the configuration parameter set #2 based on the processing capability of the second communication apparatus, then determine a group of configuration parameters from the plurality of groups of configuration parameters based on an application scenario, to further determine the configuration parameter of the second neural network.

In still another example, when the first communication apparatus is a terminal device, and the second communication apparatus is a network device, the second communication apparatus may determine the configuration parameter of the second neural network based on a processing capability of a first communication apparatus and an application scenario.

In this case, before the second communication apparatus determines the configuration parameter of the second neural network, the method 200 further includes: The second communication apparatus receives first capability information from the first communication apparatus, where the first capability information indicates a processing capability of the first communication apparatus.

As shown in Table 2, one application scenario may correspond to a plurality of groups of configuration parameters. If the second communication apparatus determines a plurality of groups of configuration parameters from the configuration parameter set #2 based on the application scenario, the second communication apparatus may determine a group of configuration parameters from the plurality of groups of configuration parameters based on the processing capability of the first communication apparatus, to further determine the configuration parameter of the second neural network.

Alternatively, the second communication apparatus may first determine a plurality of groups of configuration parameters from the configuration parameter set #2 based on the processing capability of the first communication apparatus, then determine a group of configuration parameters from the plurality of groups of configuration parameters based on an application scenario, to further determine the configuration parameter of the second neural network.

It should be understood that, in this case, each group of configuration parameters in the configuration parameter set #2 includes the configuration parameter of the first neural network and the configuration parameter of the second neural network.

After the second communication apparatus determines the configuration parameter of the second neural network, the second communication apparatus may determine the second neural network based on the configuration parameter of the second neural network.

After the second communication apparatus determines the configuration parameter of the second neural network, the second communication apparatus may determine the configuration information of the first neural network based on the configuration parameter of the second neural network.

In an example, if the configuration parameter set #1 is not prestored in the database #1, the second communication apparatus determines that the configuration information of the first neural network includes the configuration parameter of the first neural network. It should be understood that, in this case, each group of configuration parameters in the configuration parameter set #2 stored in the database #2 includes the configuration parameter of the first neural network and the configuration parameter of the second neural network.

In another example, if the configuration parameter set #1 is prestored in the database #1, the second communication apparatus may determine, as the configuration information of the first neural network, a first index value that is in the configuration parameter set #2 and that corresponds to the first determined configuration parameter of the second neural network.

In the foregoing embodiment, an example in which the second communication apparatus determines the configuration parameter of the second neural network from the configuration parameter set #2 is used for description.

Optionally, the second communication apparatus may further determine the configuration parameter of the second neural network from a subset of the configuration parameter set #2.

In this case, if the second communication apparatus is a terminal device, and the first communication apparatus is a network device, the method 200 further includes: The second communication apparatus receives RRC signaling from the first communication apparatus, where the RRC signaling indicates the subset of the configuration parameter set #2.

For example, the following field may be added to the RRC signaling to indicate the subset of the configuration parameter set #2:

Neural-network-config SEQUENCE (SIZE (1 . . . 16) OF INTEGER (Minimum_index, . . . , Maximum_index) OFTINAL, --Need N Minimum_index indicates a minimum available index value, and Maximum_index indicates a maximum available index value. The second communication apparatus may determine a subset of an available configuration parameter set #2 based on an index value indicated by the RRC signaling.

In some other possible implementations, the second communication apparatus may train a fourth neural network based on received third channel information and fourth channel information, to obtain the second neural network.

The fourth neural network may be a neural network that is first used by the second communication apparatus, and correspondingly, the third neural network first used by the first communication apparatus matches the fourth neural network. Alternatively, the fourth neural network may be a neural network initially configured in a random access process. Correspondingly, the third neural network initially configured by the first communication apparatus in the random access process matches the fourth neural network.

A manner of initially configuring the third neural network and the fourth neural network is not limited in this embodiment of this application.

In an example, the first communication apparatus determines initialization configuration parameters of the third neural network and the fourth neural network; the first communication apparatus determines the third neural network based on the initialization configuration parameter of the third neural network; and the first communication apparatus sends the initialization configuration parameter of the fourth neural network to the second communication apparatus. When the first communication apparatus is a terminal device, and the second communication apparatus is a network device, the first communication apparatus adds the initialization configuration parameter of the fourth neural network to a random access pilot or a message (msg) 3, and sends the random access pilot or the message (msg) 3 to the second communication apparatus. When the first communication apparatus is a network device and the second communication apparatus is a terminal device, the first communication apparatus adds the initialization configuration parameter of the fourth neural network to random access response signaling or conflict resolution signaling, and sends the random access response signaling or the conflict resolution signaling to the second communication apparatus.

In another example, the second communication apparatus determines initialization configuration parameters of the third neural network and the fourth neural network; the second communication apparatus determines the fourth neural network based on the initialization configuration parameter of the fourth neural network; and the second communication apparatus sends the initialization configuration parameter of the third neural network to the first communication apparatus. When the first communication apparatus is a terminal device and the second communication apparatus is a network device, the second communication apparatus adds the initialization configuration parameter of the third neural network to random access response signaling or conflict resolution signaling, and sends the random access response signaling or the conflict resolution signaling to the first communication apparatus. When the first communication apparatus is a network device, and the second communication apparatus is a terminal device, the second communication apparatus adds the initialization configuration parameter of the third neural network to a random access pilot or a message (msg) 3, and sends the random access pilot or the message (msg) 3 to the first communication apparatus.

The third channel information is obtained by the first communication apparatus through channel measurement, and the fourth channel information is obtained by the first communication apparatus based on the third channel information and the third neural network.

A manner in which the second communication apparatus trains the fourth neural network may be as follows.
(1) Obtain fifth channel information based on the fourth channel information and the fourth neural network;
(2) Calculate an error between the fifth channel information and the third channel information;
(3) Calculate a loss function based on the obtained error, calculate gradient information by using the loss function, and reversely propagate the gradient information; and
(4) Update a parameter of the fourth neural network by using a gradient descent method, to obtain an updated fourth neural network.

If a value of the loss function is less than a preset threshold after the fourth neural network is updated, the updated fourth neural network is the second neural network.

Further, the second communication apparatus sends the gradient information to the first communication apparatus as the configuration information of the first neural network. Correspondingly, after the first communication apparatus receives the gradient information, the first communication apparatus updates a parameter of the third neural network based on the gradient information by using the gradient descent method, to obtain an updated third neural network. If the configuration information of the first neural network indicates that the value of the loss function is less than the preset threshold, the updated third neural network is the first neural network.

If the configuration information of the first neural network indicates that the value of the loss function is not less than the preset threshold, or the configuration information of the first neural network does not indicate that the value of the loss function is less than the preset threshold, the first communication apparatus continues to send the third channel information and sixth channel information to the second communication apparatus, and the sixth channel information is obtained based on the third channel information by using the updated third neural network. Further, the second communication apparatus trains the updated fourth neural network based on the received third channel information and the sixth channel information.

It should be understood that the first communication apparatus and the second communication apparatus may continuously perform the foregoing step of iteratively updating on the third neural network and the fourth neural network until the value of the loss function is less than the preset threshold.

Optionally, in a process of iteratively updating on the third neural network and the fourth neural network, if a channel between the first communication apparatus and the second communication apparatus remains unchanged, the first communication apparatus may send the third channel information only once.

Optionally, in a process of iteratively updating the third neural network and the fourth neural network, if some channels between the first communication apparatus and the second communication apparatus change, the first communication apparatus may send channel information of the changed channels to the second communication apparatus.

Optionally, before S210, the method 200 may further include: The second communication apparatus sends first indication information, where the first indication information indicates to feed back the first channel information; and correspondingly, the first communication apparatus receives the first indication information.

Optionally, the second communication apparatus may send the configuration information of the first neural network together with the first indication information. In other words, the first indication information may include the configuration information of the first neural network.

As described above, the second communication apparatus may send the configuration information of the first neural network when a preset trigger condition is met. In this case, when the first indication information includes the configuration information of the first neural network, the second communication apparatus may send the first indication information when the preset trigger condition is met.

Optionally, when the first communication apparatus is a terminal device, and the second communication apparatus is a network device, the first indication information may further include configuration information of a first time-frequency resource, and the first time-frequency resource is used to transmit the first channel information. The first time-frequency resource may be on a physical uplink shared channel (PUSCH), may be on a physical uplink control channel (PUCCH), or may be on another separately defined physical channel. This is not limited in this embodiment of this application.

Optionally, when the first communication apparatus is a terminal device, and the second communication apparatus is a network device, before S240, the method 200 may further include: The first communication apparatus sends a first request message, where the first request message is used to request a first time-frequency resource, and the first request message is further used to indicate the data amount of the first channel information; and correspondingly, the second communication apparatus receives the first request message, and sends second indication information, where the second indication information indicates the configuration information of the first time-frequency resource.

Before the first communication apparatus sends the first channel information, the first communication apparatus requests the first time-frequency resource from the second communication apparatus based on the data amount of the first channel information, so that the second communication apparatus can properly allocate a resource to the first communication apparatus based on the data amount of the first channel information.

In some possible implementations, in a process in which the first communication apparatus and the second communication apparatus exchange configuration information of a neural network, the data amount of the first channel information may be determined based on performance of the first neural network. Therefore, when the second communication apparatus does not receive the first request message, the configuration information of the first time-frequency resource is sent to the first communication apparatus. For example, the configuration information of the first time-frequency resource and the configuration information of the first neural network may be sent together.

In some other possible implementations, after the first communication apparatus obtains the first channel information based on the first neural network, the first communication apparatus may further compress (for example, perform entropy encoding) the first channel information based on channel correlation. In this case, because different channels have different correlations, the data amount of the first channel information fed back by the first communication apparatus cannot be accurately estimated based on performance of the neural network. Therefore, the second communication apparatus may send the configuration information of the first time-frequency resource after the second communication apparatus receives the first request message, to allocate a more proper resource to the first communication apparatus.

Optionally, when the first communication apparatus is a terminal device, and the second communication apparatus is a network device, before S210, the method 200 may further include: The first communication apparatus sends a first request message, where the first request message is used to request a first time-frequency resource; and correspondingly, the second communication apparatus receives the first request message, and sends second indication information, where the second indication information indicates configuration information of the first time-frequency resource.

Optionally, the second communication apparatus may send the configuration information of the first neural network together with the second indication information. In other words, the second indication information may include the configuration information of the first neural network.

Optionally, the first communication apparatus may send the first request message when a preset trigger condition is met.

In an example, the preset trigger condition may be that a second timer expires, and the second timer is started when the first communication apparatus previously sends the first request message.

It may also be understood that the first communication apparatus periodically sends the first request message. For example, if a period in which the first communication apparatus sends the first request message is L, the first communication apparatus may set timing duration of the second timer to L.

For example, the first communication apparatus starts the second timer when the first communication apparatus sends the first request message for an $i^{th}$ time, and when the second timer expires, the first communication apparatus sends the first request message for a $(i+1)^{th}$ time. i is a positive integer.

In another example, the preset trigger condition may be that the first communication apparatus determines that decoding performance of first data is lower than a preset threshold. The first data is sent by the second communication apparatus based on the second channel information.

For example, in a process in which the second communication apparatus performs data transmission based on the second channel information, the second communication apparatus first calculates a precoding matrix based on the second channel information. Further, the second communication apparatus sends the first data to the first communication apparatus by using the precoding matrix. Correspondingly, the first communication apparatus decodes the first data. Further, the first communication apparatus may collect statistics on decoding performance of decoding the first data based on result information about decoding the first data, and resend the first request message to the second communication apparatus when the first communication apparatus determines that the decoding performance of the first data is lower than the preset threshold. The decoding performance of the first data may be, for example, a packet loss rate of the first data. When the packet loss rate of the first data is higher than a preset packet loss rate threshold, it may be determined that the decoding performance of the first data is lower than the preset threshold.

Figure 3:
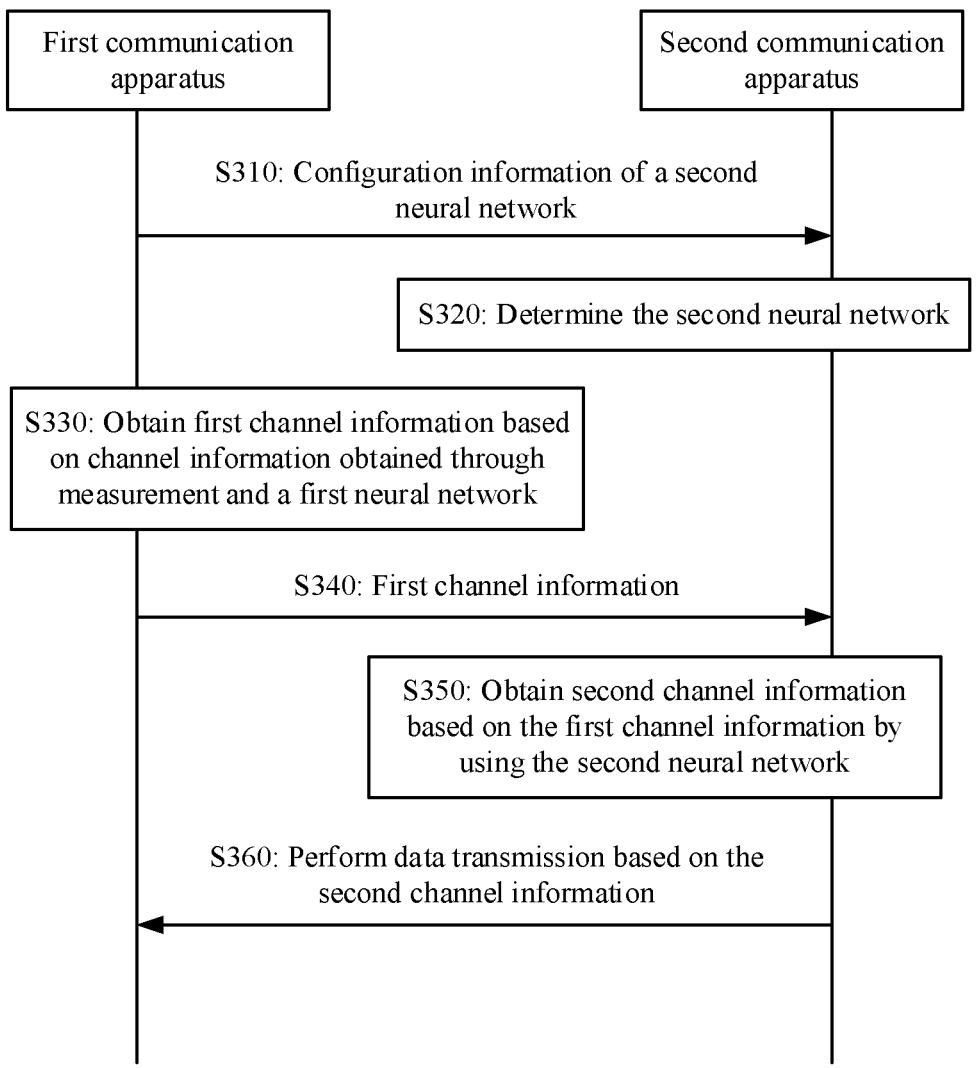
FIG. 3 is a schematic flowchart of a communication method according to another embodiment of this application.

FIG. 3 is a schematic flowchart of a communication method 300 according to another embodiment of this application. The method 300 shown in FIG. 3 may include S310 to S360. The following describes the steps in the method 300 in detail.

S310: A first communication apparatus sends configuration information of a second neural network. Correspondingly, in S310, a second communication apparatus receives the configuration information of the second neural network.

S320: The second communication apparatus determines the second neural network based on the configuration information of the second neural network.

The second neural network is configured to obtain second channel information based on first channel information fed back by the first communication apparatus, where the second channel information is the same as or similar to channel information measured by the first communication apparatus, and the second channel information is used for data transmission.

The first channel information is obtained by the first communication apparatus based on the channel information obtained through measurement and a first neural network, and a data amount of the first channel information is less than a data amount of the channel information obtained through measurement.

Specific content of the configuration information of the second neural network is not limited in this embodiment of this application.

In some possible implementations, the configuration information of the second neural network is a second index value, the second index value is used to determine a configuration parameter of the second neural network, and the second index value corresponds to a group of configuration parameters in a configuration parameter set of the neural network. It may be understood that the group of configuration parameters corresponding to the second index value include the configuration parameter of the second neural network.

In this case, after the second communication apparatus receives the second index value, the second communication apparatus may determine the configuration parameter of the second neural network based on the second index value and the configuration parameter set of the neural network stored in a database #2 (the configuration parameter set of the neural network stored in the database #2 is denoted as a configuration parameter set #2 in the following). Further, the second neural network is determined based on the configuration parameter of the second neural network. The database #2 may be a local database of the second communication apparatus, or may be a database of a network element that communicates with the second communication apparatus. This is not limited in this embodiment of this application.

Table 3 shows an example of the configuration parameter set #2.

TABLE 3

| Index value | Configuration parameter |
|---|---|
| 1 | First group of configuration parameters |
| 2 | Second group of configuration parameters |
| 3 | Third group of configuration parameters |
| ... | ... |
| N | $N^{th}$ group of configuration parameters |

N is a positive integer.

As shown in Table 3, different index values are in a one-to-one correspondence with different groups of configuration parameters. For example, if the second index value is 1, the second communication apparatus may determine that the second index value corresponds to the first group of configuration parameters. Further, the configuration parameter of the second neural network may be determined based on the first group of configuration parameters.

Table 4 shows another example of the configuration parameter set #1.

TABLE 4

| Index value | Application scenario | Configuration parameter |
|---|---|---|
| 1 | Scenario 1 | First group of configuration parameters |
| 2 | Scenario 1 | Second group of configuration parameters |
| 3 | Scenario 2 | First group of configuration parameters |
| ... | ... | ... |
| N | Scenario M | $K^{th}$ group of configuration parameters |

N, M, and K are all positive integers. The application scenario may include geographical location information, time information, and the like. The geographical location information may be, for example, indoor, outdoor, urban, or rural. The time information may be, for example, daytime, evening, workday, or rest day.

As shown in Table 4, when the index value is determined, the second communication apparatus may determine a unique group of configuration parameters based on Table 4. For example, if the second index value is 2, it may be determined that the second index value corresponds to the second group of configuration parameters. Further, the configuration parameter of the second neural network may be determined based on the second group of configuration parameters.

Content included in each group of configuration parameters in the configuration parameter set #2 is not limited in this embodiment of this application.

In an example, each group of configuration parameters may include a configuration parameter of the second neural network.

In another example, each group of configuration parameters may include a configuration parameter of the first neural network and a configuration parameter of the second neural network. The first neural network matches the second neural network, that is, the first neural network may be used to encode data, and the second neural network may be used to decode the data encoded by the first neural network.

In some other possible implementations, the configuration information of the second neural network is a configuration parameter of the second neural network.

The configuration parameter of the second neural network includes a structure of the second neural network and/or a parameter in the second neural network.

The structure of the second neural network includes one or more of the following: a type of the second neural network, a layer quantity of the second neural network, a node quantity of each layer of the second neural network, and a node connection manner of the second neural network.

The type of the second neural network may be a fully connected neural network, a convolutional neural network, a deep neural network, a recurrent neural network, or the like.

The parameter of the second neural network includes one or more of the following: a weight matrix, a weight vector, a bias matrix, a bias vector, and an activation function.

S330 to S360 are the same as S230 to S260 in the method 200. For brevity, details are not described in this embodiment of this application again.

Optionally, S310 and S340 may be one step, that is, the first communication apparatus may send the configuration information of the second neural network and the first channel information together.

In this embodiment of this application, the first communication apparatus sends the configuration information of the second neural network to the second communication apparatus, so that the second neural network used by the second communication apparatus matches the first neural network used by the first communication apparatus, and the second communication apparatus can further restore, based on the second neural network, channel information compressed by the first neural network. In this process, the first communication apparatus compresses, by using the first neural network, the channel information obtained through measurement. Therefore, the first communication apparatus may feed back the compressed channel information (the first channel information) with low overheads. Correspondingly, because the first communication apparatus feeds back the channel information obtained through measurement, the channel information (the second channel information) restored by the second communication apparatus better matches a real channel. Therefore, in a process in which the second communication apparatus performs data transmission based on the second channel information, a system throughput can be improved.

Optionally, in S310, the first communication apparatus may send the configuration information of the second neural network when a preset trigger condition is met.

In an example, the preset trigger condition may be that a third timer expires, and the third timer is started when the first communication apparatus previously sends the configuration information of the second neural network.

It may also be understood that the first communication apparatus periodically sends the configuration information of the second neural network. For example, if a period in which the first communication apparatus sends the configuration information of the second neural network is R, the first communication apparatus may set timing duration of the third timer to R.

For example, the first communication apparatus starts the third timer when the first communication apparatus sends the configuration information of the second neural network for an $i^{th}$ time, and when the third timer expires, the first communication apparatus sends the configuration information of the second neural network for a $(i+1)^{th}$ time. The configuration information of the second neural network sent by the first communication apparatus for the $(i+1)^{th}$ time may be the same as or different from the configuration information of the second neural network sent by the first communication apparatus for the $i^{th}$ time. This is not limited in this embodiment of this application. For example, before the configuration information of the second neural network is sent for the $(i+1)^{th}$ time, a scenario between the first communication apparatus and the second communication apparatus changes. In this case, the configuration information of the second neural network that is sent for the $(i+1)^{th}$ time may be different from the configuration information of the second neural network that is sent for the $i^{th}$ time. For another example, before the configuration information of the second neural network is sent for the $(i+1)^{th}$ time, a scenario between the first communication apparatus and the second communication apparatus remains unchanged. In this case, the configuration information of the second neural network that is sent for the $(i+1)^{th}$ time may be the same as the configuration information of the second neural network that is sent for the $i^{th}$ time. i is a positive integer.

In another example, the preset trigger condition may be that the first communication apparatus determines that decoding performance of first data is lower than a preset threshold. The first data is sent by the second communication apparatus based on the second channel information.

For example, in a process in which the second communication apparatus performs data transmission based on the second channel information, the second communication apparatus first calculates a precoding matrix based on the second channel information. Further, the second communication apparatus sends the first data to the first communication apparatus by using the precoding matrix. Correspondingly, the first communication apparatus decodes the first data based on the precoding matrix. Further, the first communication apparatus may collect statistics on decoding performance of decoding the first data based on result information about decoding the first data, and resend the configuration information of a new second neural network when the first communication apparatus determines that the decoding performance of the first data is lower than the preset threshold. The decoding performance of the first data may be, for example, a packet loss rate of the first data. When the packet loss rate of the first data is higher than a preset packet loss rate threshold, it may be determined that the decoding performance of the first data is lower than the preset threshold.

Optionally, before S310, the method 300 may further include: The first communication apparatus determines the configuration information of the second neural network and a first neural network.

The first communication apparatus may first determine a configuration parameter of the first neural network, and then determine the first neural network and the configuration information of the second neural network based on the configuration parameter of the first neural network.

The first communication apparatus may determine the configuration parameter of the first neural network from a configuration parameter set of the neural network stored in a database #1 (the configuration parameter set of the neural network stored in the database #1 is denoted as a configuration parameter set #1 in the following).

The database #1 may be a local database of the first communication apparatus, or may be a database of a network element that communicates with the first communication apparatus. This is not limited in this embodiment of this application.

For a form of the configuration parameter set #1, refer to descriptions about the configuration parameter set #1 in Table 1 and Table 2.

The following shows several possible combination manners of the configuration parameter set #1 and the configuration parameter set #2.

Manner 1: Each group of configuration parameters in the configuration parameter set #1 may include the configuration parameter of the first neural network, and each group of configuration parameters in the configuration parameter set #2 may include the configuration parameter of the second neural network.

Manner 2: Each group of configuration parameters in the configuration parameter set #1 may include the configuration parameter of the first neural network and the configuration parameter of the second neural network, and each group of configuration parameters in the configuration parameter set #2 may include the configuration parameter of the second neural network.

Manner 3: Each group of configuration parameters in the configuration parameter set #1 may include the configuration parameter of the first neural network and the configuration parameter of the second neural network, and each group of configuration parameters in the configuration parameter set #2 may include the configuration parameter of the first neural network and the configuration parameter of the second neural network.

It should be noted that, in the foregoing three manners, the configuration parameter that is of the first neural network and that is determined from the configuration parameter set #1 based on a same index value matches the configuration parameter that is of the second neural network and that is determined from the configuration parameter set #2 based on the same index value. It may be understood that the first neural network and the second neural network that are determined based on matched configuration parameters of the first neural network and the second neural network match each other.

In an example, the first communication apparatus may determine the configuration parameter of the first neural network from the configuration parameter set #1 based on an application scenario.

The first communication apparatus may determine the configuration parameter of the first neural network based on a scenario in which the first neural network and the second neural network are used. For example, if the first communication apparatus and the second communication apparatus use the first neural network and the second neural network in an outdoor scenario, the first communication apparatus may determine, from the configuration parameter set #1, a group of configuration parameters corresponding to the outdoor scenario, to further determine the configuration parameter of the first neural network. For another example, if the first communication apparatus and the second communication apparatus use the first neural network and the second neural network in a daytime scenario, the first communication apparatus may determine, from the configuration parameter set #1, a group of configuration parameters corresponding to the daytime scenario, to further determine the configuration parameter of the first neural network.

In another example, when the first communication apparatus is a terminal device, and the second communication apparatus is a network device, the first communication apparatus may determine the first neural network based on a processing capability of the first communication apparatus and an application scenario.

As shown in Table 4, one application scenario may correspond to a plurality of groups of configuration parameters. If the first communication apparatus determines a plurality of groups of configuration parameters from the configuration parameter set #1 based on the application scenario, the first communication apparatus may further determine a group of configuration parameters from the plurality of groups of configuration parameters based on the processing capability of the first communication apparatus, to further determine the configuration parameter of the first neural network.

Alternatively, the first communication apparatus may first determine a plurality of groups of configuration parameters from the configuration parameter set #1 based on the processing capability of the first communication apparatus, then determine a group of configuration parameters from the plurality of groups of configuration parameters based on an application scenario, to further determine the configuration parameter of the first neural network.

In still another example, when the first communication apparatus is a network device, and the second communication apparatus is a terminal device, the first communication apparatus may determine the configuration parameter of the first neural network based on a processing capability of the second communication apparatus and an application scenario.

In this case, before the first communication apparatus determines the configuration parameter of the first neural network, the method 300 further includes: The first communication apparatus receives second capability information from the second communication apparatus, where the second capability information indicates the processing capability of the second communication apparatus.

As shown in Table 4, one application scenario may correspond to a plurality of groups of configuration parameters. If the first communication apparatus determines a plurality of groups of configuration parameters from the configuration parameter set #1 based on the application scenario, the first communication apparatus may determine a group of configuration parameters from the plurality of groups of configuration parameters based on the processing capability of the second communication apparatus, to further determine the configuration parameter of the first neural network.

Alternatively, the first communication apparatus may first determine a plurality of groups of configuration parameters from the configuration parameter set #1 based on the processing capability of the second communication apparatus, then determine a group of configuration parameters from the plurality of groups of configuration parameters based on an application scenario, to further determine the configuration parameter of the first neural network.

It should be understood that, in this case, each group of configuration parameters in the configuration parameter set #1 includes the configuration parameter of the first neural network and the configuration parameter of the second neural network.

After the first communication apparatus determines the configuration parameter of the first neural network, the first communication apparatus may determine the first neural network based on the configuration parameter of the first neural network.

After the first communication apparatus determines the configuration parameter of the first neural network, the first communication apparatus may determine the configuration information of the second neural network based on the configuration parameter of the first neural network.

In an example, if the configuration parameter set #2 is not prestored in a database #2, the first communication apparatus determines that the configuration information of the second neural network includes the configuration parameter of the second neural network. It should be understood that, in this case, each group of configuration parameters in the configuration parameter set #1 stored in the database #1 includes the configuration parameter of the first neural network and the configuration parameter of the second neural network.

In another example, if the configuration parameter set #2 is pre-stored in the database #2, the first communication apparatus may determine, as the configuration information of the second neural network, a second index value that is in the configuration parameter set #1 and that is corresponding to the pre-determined configuration parameter of the first neural network.

In the foregoing embodiment, an example in which the first communication apparatus determines the configuration parameter of the first neural network from the configuration parameter set #1 is used for description.

Optionally, the first communication apparatus may further determine the configuration parameter of the first neural network from a subset of the configuration parameter set #1.

In this case, if the first communication apparatus is a terminal device, and the second communication apparatus is a network device, the method 300 further includes: The first communication apparatus receives RRC signaling from the second communication apparatus, where the RRC signaling indicates the subset of the configuration parameter set #1.

For example, the following field may be added to the RRC signaling to indicate the subset of the configuration parameter set #1:

Neural-network-config SEQUENCE (SIZE (1 . . . 16) OF
 INTEGER (Minimum_index, . . . , Maximum_index)
 OFTINAL, --Need N Minimum_index indicates a minimum available index value, and Maximum_index indicates a maximum available index value. The first communication apparatus may determine a subset of an available configuration parameter set #1 based on an index value indicated by the RRC signaling.

Optionally, before S310, the method 300 may further include: The second communication apparatus sends first indication information, where the first indication information indicates to feed back the first channel information; and correspondingly, the first communication apparatus receives the first indication information.

Optionally, the second communication apparatus may send the first indication information when a preset trigger condition is met.

In an example, the preset trigger condition may be that a fourth timer expires, and the fourth timer is started when the second communication apparatus previously sends the first indication information.

It may also be understood that the second communication apparatus periodically sends the first indication information. For example, if a period in which the second communication apparatus sends the first indication information is S, the second communication apparatus may set timing duration of the fourth timer to S.

For example, the second communication apparatus starts the fourth timer when the second communication apparatus sends the first indication information for an $i^{th}$ time, and when the fourth timer expires, the second communication apparatus sends the first indication information for a $(i+1)^{th}$ time. i is a positive integer.

In another example, the preset trigger condition may be that the second communication apparatus determines that decoding performance of the first data is lower than a preset threshold. The first data is sent by the second communication apparatus based on the second channel information.

For example, in a process in which the second communication apparatus performs data transmission based on the second channel information, the second communication apparatus first calculates a precoding matrix based on the second channel information. Further, the second communication apparatus sends the first data to the first communication apparatus by using the precoding matrix. Correspondingly, the first communication apparatus decodes the first data. Further, the first communication apparatus may feed back result information about decoding the first data to the second communication apparatus. After the second communication apparatus receives the data decoding result information fed back by the first communication apparatus, the second communication apparatus may collect statistics on decoding performance of decoding the first data by the first communication apparatus, and resend the first indication information when determining that the decoding performance of decoding the first data by the first communication apparatus is lower than a preset threshold. The decoding performance of the first data may be, for example, a packet loss rate of the first data. When the packet loss rate of the first data is higher than a preset packet loss rate threshold, it may be determined that the decoding performance of the first data is lower than the preset threshold.

Optionally, when the first communication apparatus is a terminal device, and the second communication apparatus is a network device, the first indication information may further include configuration information of a first time-frequency resource, and the first time-frequency resource is used to transmit the first channel information. The first time-frequency resource may be on a PUSCH, may be on a PUCCH, or may be on another separately defined physical channel. This is not limited in this embodiment of this application.

Optionally, when the first communication apparatus is a terminal device, and the second communication apparatus is a network device, before S310, the method 300 may further include: The first communication apparatus sends a first request message, where the first request message is used to request a first time-frequency resource, and the first request message is further used to indicate the data amount of the first channel information; and correspondingly, the second communication apparatus receives the first request message, and sends second indication information, where the second indication information indicates the configuration information of the first time-frequency resource.

Optionally, the first communication apparatus may send the configuration information of the second neural network together with the first request message. In other words, the first request message may include the configuration information of the second neural network.

As described above, the first communication apparatus may send the configuration information of the second neural network when a preset trigger condition is met. In this case, when the first request message includes the configuration information of the second neural network, the first communication apparatus may send the first request message when the preset trigger condition is met.

Figure 4:
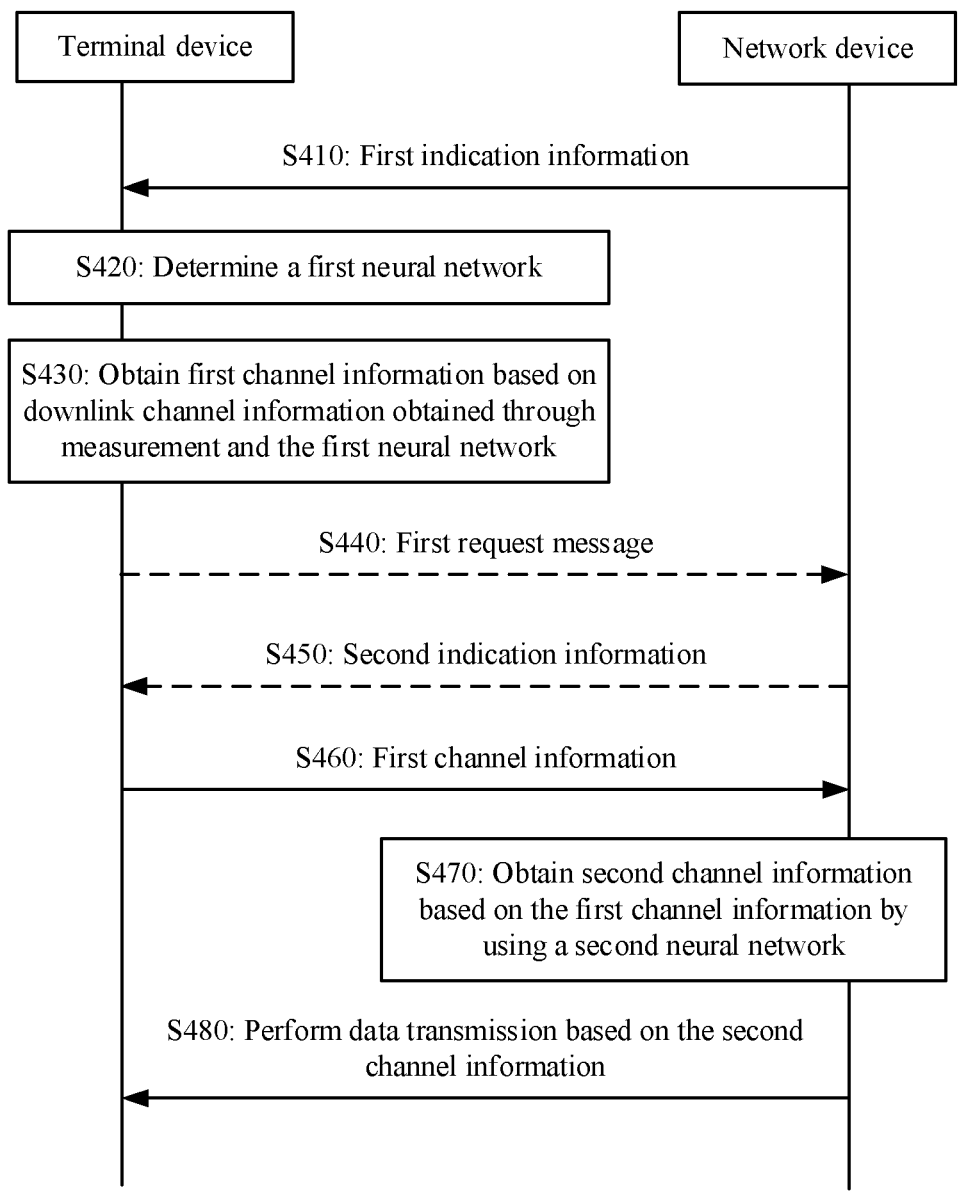
FIG. 4 is a schematic flowchart of a communication method according to another embodiment of this application.
Figure 5:
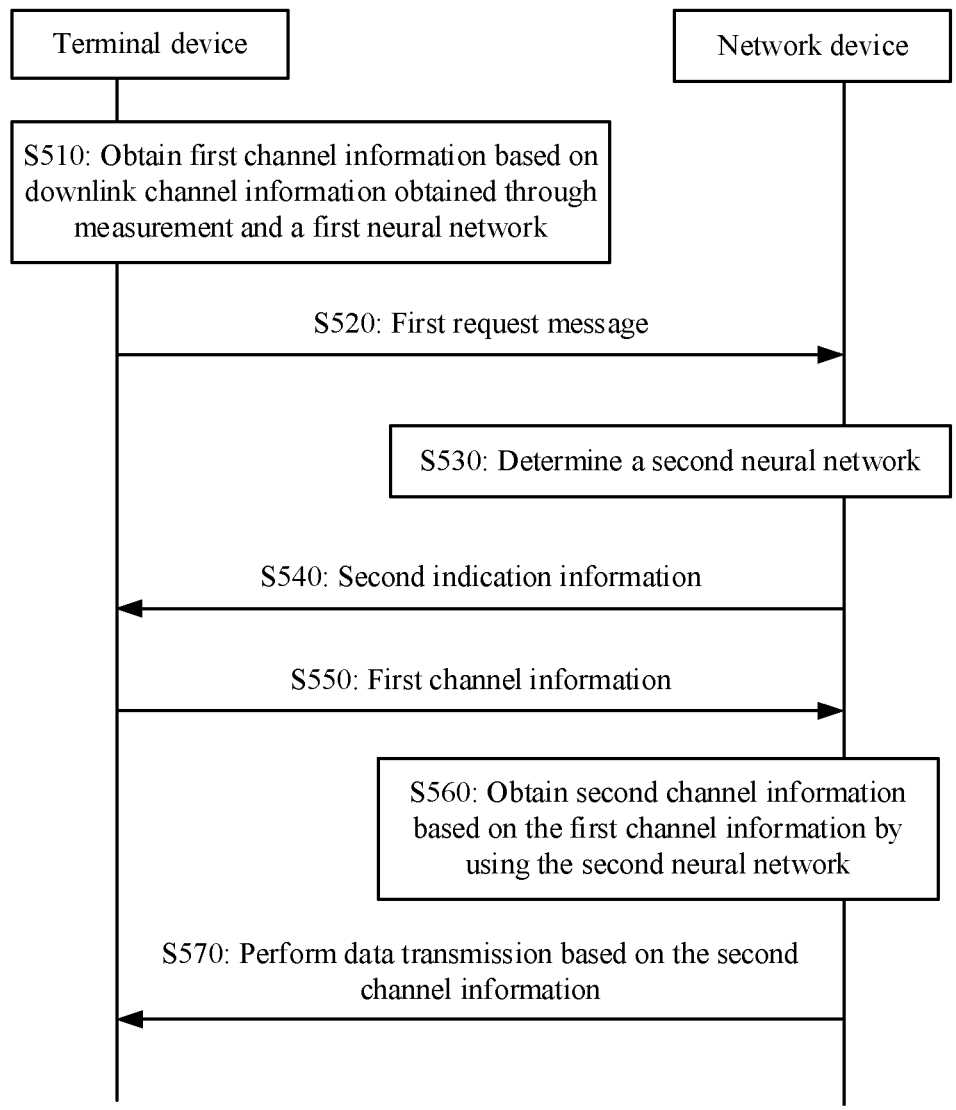
FIG. 5 is a schematic flowchart of a communication method according to another embodiment of this application.

The following describes the communication method provided in embodiments of this application by using an example in which the first communication apparatus is a terminal network device and the second communication apparatus is a network device with reference to FIG. 4 and FIG. 5.

In the method shown in FIG. 4, an example in which a network device sends configuration information of a neural network to a terminal device is used for description. As shown in FIG. 4, a method 400 may include S410 to S480. The following describes each step in detail.

S410: The network device sends first indication information. Correspondingly, in S410, the terminal device receives the first indication information.

The first indication information includes configuration information of a first neural network.

Optionally, the first indication information may further include configuration information of a first time-frequency resource. If the first indication information includes the configuration information of the first time-frequency resource, S440 and S450 may not be performed in the method 400.

S420: The terminal device determines the first neural network based on the configuration information of the first neural network.

For descriptions of the configuration information of the first neural network, refer to the foregoing descriptions in S210 to S220. For brevity, details are not described in this embodiment of this application again.

S430: The terminal device obtains first channel information based on downlink channel information obtained through measurement and the first neural network.

A data amount of the first channel information is less than a data amount of the downlink channel information obtained through measurement.

S440: The terminal device sends a first request message. Correspondingly, in S440, the network device receives the first request message.

The first request message is used to request the first time-frequency resource, the first request message further indicates the data amount of the first channel information, and the first time-frequency resource is used to transmit the first channel information.

S450: The network device sends second indication information. Correspondingly, in S450, the terminal device receives the second indication information.

The second indication information indicates the configuration information of the first time-frequency resource.

S460: The terminal device sends the first channel information. Correspondingly, in S460, the network device receives the first channel information.

S470: The network device obtains second channel information based on the first channel information by using a second neural network.

It may be understood that the second channel information is the same as or similar to the downlink channel information obtained by the terminal device by measuring a channel.

S480: The network device transmits downlink data based on the second channel information.

The network device may calculate a downlink precoding matrix based on the second channel information. Further, the network device sends first data to the terminal device by using the downlink precoding matrix. Correspondingly, after the terminal device receives the first data from the network device, the terminal device decodes the first data.

S430 to S480 may be repeated for a plurality of times based on duration of communication between the terminal device and the network device. Alternatively, S430 and S460 to S480 may be repeated for a plurality of times.

In the method shown in FIG. 5, an example in which a terminal device sends configuration information of a neural network to a network device is used for description. As shown in FIG. 5, a method 500 may include S510 to S570. The following describes each step in detail.

S510: The terminal device obtains first channel information based on downlink channel information obtained through measurement and the first neural network.

A data amount of the first channel information is less than a data amount of the downlink channel information obtained through measurement.

S520: The terminal device sends a first request message. Correspondingly, in S520, the network device receives the first request message.

The first request message includes configuration information of a second neural network, the first request message is used to request a first time-frequency resource, the first request message further indicates the data amount of the first channel information, and the first time-frequency resource is used to transmit the first channel information.

S530: The network device determines the second neural network based on the configuration information of the second neural network.

For descriptions of the configuration information of the second neural network, refer to the foregoing descriptions in S310 to S320. For brevity, details are not described in this embodiment of this application again.

S540: The network device sends second indication information. Correspondingly, in S540, the terminal device receives the second indication information.

The second indication information indicates configuration information of the first time-frequency resource.

S550: The terminal device sends the first channel information. Correspondingly, in S550, the network device receives the first channel information.

S560: The network device obtains second channel information based on the first channel information by using the second neural network.

It may be understood that the second channel information is the same as or similar to the downlink channel information obtained by the terminal device by measuring a channel.

S570: The network device transmits downlink data based on the second channel information.

The network device may calculate a downlink precoding matrix based on the second channel information. Further, the network device sends first data to the terminal device by using the downlink precoding matrix. Correspondingly, after the terminal device receives the first data from the network device, the terminal device decodes the first data.

Figure 6:
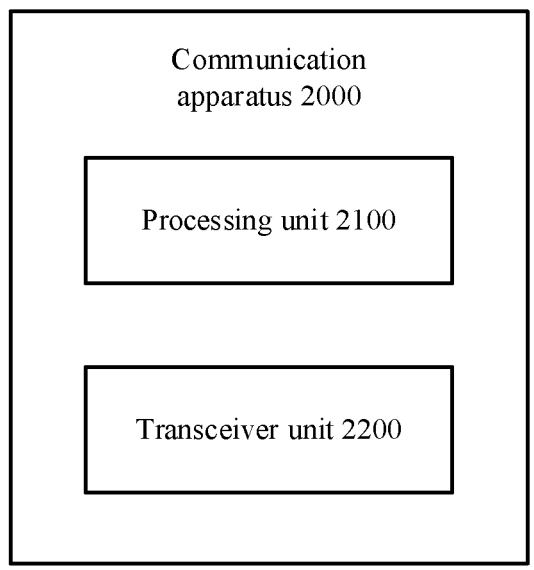
FIG. 6 is a schematic diagram of a communication apparatus according to an embodiment of this application.
Figure 7:
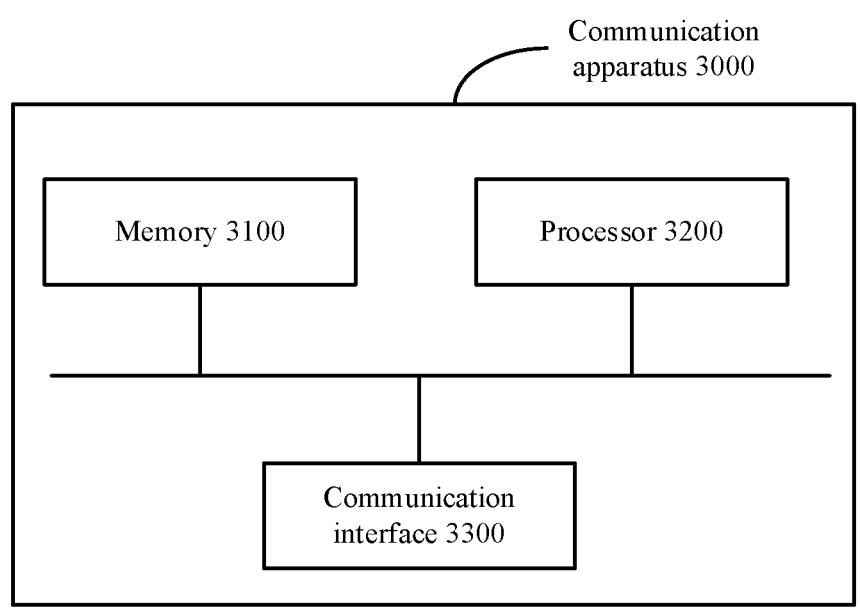
FIG. 7 is a schematic block diagram of a communication apparatus according to another embodiment of this application.
Figure 8:
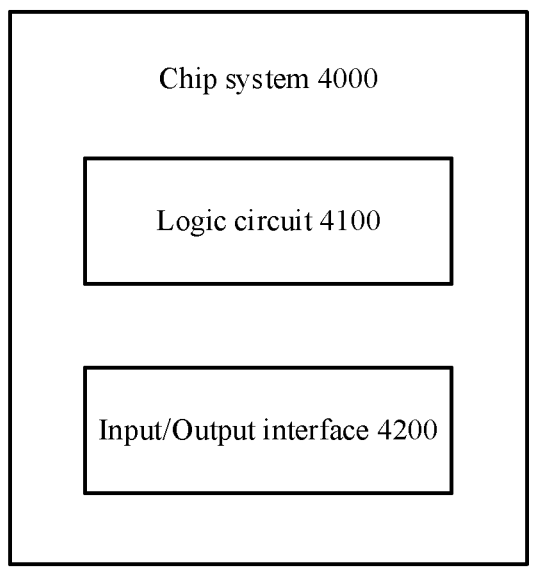
FIG. 8 is a schematic diagram of a chip system according to an embodiment of this application.

The foregoing describes in detail the methods in embodiments of this application with reference to FIG. 2 to FIG. 5, and the following describes in detail apparatuses in embodiments of this application with reference to FIG. 6 to FIG. 8. It should be noted that the apparatuses shown in FIG. 6 to FIG. 8 may implement the steps in the foregoing methods. For brevity, details are not described herein again.

FIG. 6 is a schematic block diagram of a communication apparatus according to an embodiment of this application. As shown in FIG. 6, the communication apparatus 2000 may include a processing unit 2100 and a transceiver unit 2200.

In a possible design, the communication apparatus 2000 may correspond to the first communication apparatus in the foregoing method embodiments, for example, may be the first communication apparatus, or a component (such as a chip or a chip system) configured in the first communication apparatus.

It should be understood that the communication apparatus 2000 may correspond to the first communication apparatus in the method 200 and the method 300 according to embodiments of this application. The communication apparatus 2000 may include units configured to perform the methods performed by the first communication apparatus in the method 200 in FIG. 2 and the method 300 in FIG. 3. In addition, the units in the communication apparatus 2000 and the foregoing other operations and/or functions are separately used to implement corresponding procedures of any method in the method 200 in FIG. 2 and the method 300 in FIG. 3. It should be understood that a specific process in which the units perform the foregoing corresponding steps is described in detail in the foregoing method embodiments. For brevity, details are not described herein.

In another possible design, the communication apparatus 2000 may correspond to the second communication apparatus in the foregoing method embodiments, for example, may be the second communication apparatus, or a component (such as a chip or a chip system) configured in the second communication apparatus.

It should be understood that the communication apparatus 2000 may correspond to the second communication apparatus in the method 200 and the method 300 according to embodiments of this application. The communication apparatus 2000 may include units configured to perform the methods performed by the second communication apparatus in the method 200 in FIG. 2 and the method 300 in FIG. 3. In addition, the units in the communication apparatus 2000 and the foregoing other operations and/or functions are separately used to implement corresponding procedures of any method in the method 200 in FIG. 2 and the method 300 in FIG. 3. It should be understood that a specific process in which the units perform the foregoing corresponding steps is described in detail in the foregoing method embodiments. For brevity, details are not described herein.

In still another possible design, the communication apparatus 2000 may correspond to the terminal device in the foregoing method embodiments, for example, may be the terminal device, or a component (such as a chip or a chip system) configured in the terminal device.

It should be understood that the communication apparatus 2000 may correspond to the terminal device in the method 400 and the method 500 according to embodiments of this application. The communication apparatus 2000 may include units configured to perform the methods performed by the terminal device in the method 400 in FIG. 4 and the method 500 in FIG. 5. In addition, the units in the communication apparatus 2000 and the foregoing other operations and/or functions are separately used to implement corresponding procedures of any method in the method 400 in FIG. 4 and the method 500 in FIG. 5. It should be understood that a specific process in which the units perform the foregoing corresponding steps is described in detail in the foregoing method embodiments. For brevity, details are not described herein.

It should be further understood that when the communication apparatus 2000 is a chip configured in a terminal device, the transceiver unit 2200 in the communication apparatus 2000 may be implemented by using an input/output interface, the processing unit 2100 in the communication apparatus 2000 may be implemented by using the chip, a processor, a microprocessor, an integrated circuit, or the like that are integrated in a chip system.

In still another possible design, the communication apparatus 2000 may correspond to the network device in the foregoing method embodiments, for example, may be the network device, or may be a component (such as a chip or a chip system) configured in the network device.

It should be understood that the communication apparatus 2000 may correspond to the network device in the method 400 and the method 500 according to embodiments of this application. The communication apparatus 2000 may include units configured to perform the methods performed by the network device in the method 400 in FIG. 4 and the method 500 in FIG. 5. In addition, the units in the communication apparatus 2000 and the foregoing other operations and/or functions are separately used to implement corresponding procedures of any method in the method 400 in FIG. 4 and the method 500 in FIG. 5. It should be understood that a specific process in which the units perform the foregoing corresponding steps is described in detail in the foregoing method embodiments. For brevity, details are not described herein.

It should be further understood that when the communication apparatus 2000 is a chip configured in a network device, the transceiver unit 2200 in the communication apparatus 2000 may be implemented by using an input/output interface, the processing unit 2100 in the communication apparatus 2000 may be implemented by using the chip, a processor, a microprocessor, an integrated circuit, or the like that are integrated in a chip system.

FIG. 7 is a schematic block diagram of a communication apparatus according to another embodiment of this application. A communication apparatus 3000 shown in FIG. 7 may include a memory 3100, a processor 3200, and a communication interface 3300. The memory 3100, the processor 3200, and the communication interface 3300 are connected by using an internal connection path. The memory 3100 is configured to store instructions. The processor 3200 is configured to execute the instructions stored in the memory 3100, to control the input/output interface 3000 to receive/send configuration information of a first neural network or configuration information of a second neural network. Optionally, the memory 3100 may be coupled to the processor 3200 by using an interface, or may be integrated with the processor 3200.

It should be noted that the communication interface 3300 uses a transceiver apparatus, for example, but not limited to a transceiver, to implement communication between the communication apparatus 3000 and another device or a communication network. The communication interface 3300 may further include an input/output interface.

In an implementation process, steps in the foregoing methods may be implemented by using an integrated logic circuit of hardware in the processor 3200, or by using instructions in a form of software. The methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 3100, and the processor 3200 reads information in the memory 3100 and completes the steps in the foregoing methods in combination with hardware of the processor 3200. To avoid repetition, details are not described herein again.

It should be understood that, the processor in embodiments of this application may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It should also be understood that in embodiments of this application, the memory may include a read-only memory and a random access memory, and provide instructions and data to the processor. A part of the processor may further include a non-volatile random access memory. For example, the processor may further store information of a device type.

FIG. 8 is a schematic diagram of a chip system according to an embodiment of this application. A chip system 4000 shown in FIG. 8 includes a logic circuit 4100 and an input/output interface 4200. The logic circuit is configured to be coupled to: the input interface, and transmit data (for example, configuration information of a first neural network) by using the input/output interface, to perform the methods described in FIG. 2 to FIG. 5.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processor (DSP), a micro controller unit (MCU), a programmable controller (PLD), or another integrated chip.

In an implementation process, steps in the foregoing methods may be implemented by using an integrated logic circuit of hardware in the processor, or by using instructions in a form of software. The steps of the methods disclosed with reference to embodiments of this application may be directly performed and completed by a hardware processor, or may be performed and completed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that, the processor in embodiments of this application may be an integrated circuit chip, and has a signal processing capability. In an implementation process, steps in the foregoing method embodiments may be implemented by using an integrated logic circuit of hardware in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the method provided in embodiments of this application, this application further provides a computer program product. The computer program product includes computer program code. When the computer program code is run on a computer, the computer is enabled to perform the methods separately performed by the first communication apparatus and the second communication apparatus in the embodiments shown in FIG. 2 and FIG. 3, or perform the methods separately performed by the terminal device and the network device in the embodiments shown in FIG. 4 and FIG. 5.

According to the method provided in embodiments of this application, this application further provides a computer-readable storage medium. The computer-readable storage medium stores program code. When the program code is run on a computer, the computer is enabled to perform the methods separately performed by the first communication apparatus and the second communication apparatus in the embodiments shown in FIG. 2 and FIG. 3, or perform the methods separately performed by the terminal device and the network device in the embodiments shown in FIG. 4 and FIG. 5.

According to the method provided in embodiments of this application, this application further provides a system, including the foregoing one or more first communication apparatuses and one or more second communication apparatuses. The first communication apparatus may be a terminal device, and the second communication apparatus may be a network device; or the first communication apparatus may be a network device, and the second communication apparatus may be a terminal device.

The network device and the terminal device in the foregoing apparatus embodiments completely correspond to the network device and the terminal device in the method embodiments. A corresponding module or unit performs a corresponding step. For example, a communication unit (a transceiver) performs a receiving or sending step in the method embodiments, and a processing unit (a processor) performs another step other than the sending or receiving step. For a function of a specific unit, refer to a corresponding method embodiment. There may be one or more processors.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both of a computing device and an application running on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the internet interacting with other systems by using the signal).

A person of ordinary skill in the art may be aware that, various illustrative logical blocks and steps that are described with reference to the embodiments disclosed in this specification may be implemented by using electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

In the foregoing embodiments, all or some of the functions of the function units may be implemented by using software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state disk (SSD)), or the like.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a first communication apparatus, configuration information of a first neural network, wherein the configuration information of the first neural network is based on at least one of a processing capability of the first communication apparatus or an application scenario;
   determining, by the first communication apparatus, the first neural network based on the configuration information of the first neural network;
   obtaining, by the first communication apparatus, first channel information based on channel information obtained through measurement and the first neural network, wherein a first data amount of the first channel information is less than a data amount of the channel information obtained through measurement; and
   sending, by the first communication apparatus, the first channel information, wherein the first channel information is used to obtain second channel information by using a second neural network, and the second channel information is used for data transmission.

2. The method according to claim 1, wherein the configuration information of the first neural network is a first index value, the first index value is used to determine a configuration parameter of the first neural network, and the first index value corresponds to a group of configuration parameters in a configuration parameter set of the first neural network.

3. The method according to claim 1, wherein the configuration information of the first neural network comprises a configuration parameter of the first neural network.

4. The method according to claim 3,
   wherein the configuration parameter of the first neural network comprises a structure of the first neural network and a parameter in the first neural network,
   wherein the structure of the first neural network comprises one or more of: a type of the first neural network, a layer quantity of the first neural network, a node quantity of the first neural network, or a node connection manner of the first neural network, and
   wherein the parameter in the first neural network comprises one or more of: a weight matrix, a weight vector, a bias matrix, a bias vector, or an activation function.

5. The method according to claim 1, wherein the method further comprises:
   sending, by the first communication apparatus, first capability information, wherein the first capability information indicates the processing capability of the first communication apparatus.

6. The method according to claim 1, wherein the receiving, by the first communication apparatus, the configuration information of the first neural network comprises:
   receiving, by the first communication apparatus, first indication information, wherein the first indication information indicates to feed back the first channel information, and the first indication information further comprises the configuration information of the first neural network.

7. The method according to claim 1, wherein the method further comprises:
before the sending, by the first communication apparatus, the first channel information:
sending, by the first communication apparatus, a first request message, wherein the first request message requests a first time-frequency resource, the first time-frequency resource is used to transmit the first channel information, and the first request message further indicates the data amount of the first channel information; and
receiving, by the first communication apparatus, second indication information, wherein the second indication information indicates resource configuration information of the first time-frequency resource.

8. The method according to claim 1, wherein the method further comprises:
before the receiving, by the first communication apparatus, the configuration information of the first neural network:
sending, by the first communication apparatus, a first request message, wherein the first request message requests a first time-frequency resource, and the first time-frequency resource is used to transmit the first channel information; and
wherein the receiving, by the first communication apparatus, the configuration information of the first neural network comprises:
receiving, by the first communication apparatus, second indication information, wherein the second indication information indicates resource configuration information of the first time-frequency resource, and the second indication information further comprises the configuration information of the first neural network.

9. A method, comprising:
sending, by a second communication apparatus to a first communication apparatus, configuration information of a first neural network, wherein the configuration information of the first neural network is based on at least one of a processing capability of the first communication apparatus or an application scenario;
receiving, by the second communication apparatus, first channel information that is fed back, wherein the first channel information is obtained based on channel information obtained through measurement and the first neural network, and a first data amount of the first channel information is less than a data amount of the channel information obtained through measurement; and
performing, by the second communication apparatus, data transmission based on second channel information, wherein the second channel information is obtained based on the first channel information by using a second neural network.

10. The method according to claim 9, wherein the configuration information of the first neural network is a first index value, the first index value is used to determine a configuration parameter of the first neural network, and the first index value corresponds to a group of configuration parameters in a configuration parameter set of the first neural network.

11. The method according to claim 9, wherein the configuration information of the first neural network comprises a configuration parameter of the first neural network.

12. The method according to claim 11,
wherein the configuration parameter of the first neural network comprises a structure of the first neural network and a parameter in the first neural network,
wherein the structure of the first neural network comprises one or more of: a type of the first neural network, a layer quantity of the first neural network, a node quantity of the first neural network, or a node connection manner of the first neural network, and
wherein the parameter in the first neural network comprises one or more of: a weight matrix, a weight vector, a bias matrix, a bias vector, or an activation function.

13. The method according to claim 9, wherein the method further comprises:
before the sending, by the second communication apparatus, the configuration information of the first neural network:
determining, by the second communication apparatus, the configuration information of the first neural network and second configuration of the second neural network.

14. The method according to claim 13, wherein the method further comprises:
before the determining, by the second communication apparatus, the configuration information of the first neural network and the second configuration of the second neural network:
receiving, by the second communication apparatus, first capability information, wherein the first capability information indicates the processing capability of the first communication apparatus.

15. The method according to claim 9, wherein the sending, by the second communication apparatus, the configuration information of the first neural network comprises:
sending, by the second communication apparatus, first indication information, wherein the first indication information indicates to feed back the first channel information, and the first indication information further comprises the configuration information of the first neural network.

16. A communication apparatus, comprising:
at least one processor; and
a non-transitory computer readable storage medium storing programming, the programming including instructions that, when executed by the at least one processor, cause the communication apparatus to perform operations including:
receiving configuration information of a first neural network, wherein the configuration information of the first neural network is based on at least one of a processing capability of the communication apparatus or an application scenario;
determining the first neural network based on the configuration information of the first neural network;
obtaining first channel information based on channel information obtained through measurement and the first neural network, wherein a first data amount of the first channel information is less than a data amount of the channel information obtained through measurement; and
sending the first channel information, wherein the first channel information is used to obtain second channel information by using a second neural network, and the second channel information is used for data transmission.

17. The communication apparatus according to claim 16, wherein the configuration information of the first neural network is a first index value, the first index value is used to determine a configuration parameter of the first neural network, and the first index value corresponds to a group of configuration parameters in a configuration parameter set of the first neural network.

18. The method according to claim 1, wherein the application scenario includes at least one of geographical location information or time information.

19. The method according to claim 9, wherein the application scenario includes at least one of geographical location information or time information.

20. The communication apparatus according to claim 16, wherein the application scenario includes at least one of geographical location information or time information.

* * * * *